(12) United States Patent
Shirasaki

(10) Patent No.: US 6,901,183 B2
(45) Date of Patent: May 31, 2005

(54) OPTICAL WAVELENGTH DIVISION MULTIPLEXED SYSTEM USING WAVELENGTH SPLITTERS

(75) Inventor: Masataka Shirasaki, Winchester, MA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/390,784

(22) Filed: Mar. 19, 2003

(65) Prior Publication Data

US 2003/0179989 A1 Sep. 25, 2003

Related U.S. Application Data

(62) Division of application No. 09/185,505, filed on Nov. 4, 1998, now Pat. No. 6,556,742.

(51) Int. Cl.[7] ................................................. G02B 6/28
(52) U.S. Cl. ............................... 385/24; 385/16; 385/18
(58) Field of Search ............................... 385/24, 16, 18; 398/82; 356/460

(56) References Cited

U.S. PATENT DOCUMENTS

| | | |
|---|---|---|
| 5,339,157 A | 8/1994 | Glance et al. |
| 5,650,849 A * | 7/1997 | Malvern ..................... 356/460 |
| 5,680,490 A | 10/1997 | Cohen et al. |
| 5,841,918 A | 11/1998 | Li |
| 5,852,505 A | 12/1998 | Li |
| 6,160,932 A | 12/2000 | Huang et al. |
| 6,208,442 B1 | 3/2001 | Liu et al. |
| 6,285,810 B1 | 9/2001 | Fincato et al. |
| 2001/0024542 A1 * | 9/2001 | Aina et al. .................... 385/24 |

* cited by examiner

Primary Examiner—Kaveh C. Kiunni
Assistant Examiner—Michael P. Mooney
(74) Attorney, Agent, or Firm—Staas & Halsey LLP

(57) ABSTRACT

An optical wavelength division multiplexed system uses wavelength splitters to split channels included in input light into different paths within the system. Odd-numbered channels are split into one path, and even-numbered channels are split into another path, providing increased isolation between channels. Using filters, the system then drops one or more of the isolated, split channels into paths referred to as dropped paths and allows the remaining channels to continue through the filters into output paths. The dropped paths are then combined into one, common dropped path, and the output paths are also combined into one, common output path.

8 Claims, 16 Drawing Sheets

PRIOR ART

OPTICAL WAVELENGTH DIVISION MULTIPLEXED SYSTEM USING WAVELENGTH SPLITTERS

This is a division of application Ser. No. 09/185,505, filed on Nov. 4, 1998, now U.S. Pat. No. 6,556,742.

BACKGROUND OF THE INVENTION

1. Field of the Invention

The present invention relates to optical systems, and, more particularly, to optical wavelength division multiplexed systems in which channels are multiplexed and demultiplexed.

2. Description of the Related Art

An optical wavelength division multiplexed (WDM) system is an optical system carrying many different wavelengths, or frequencies, of light. The frequencies are closely spaced, and, from an information systems perspective, are also referred to as channels, which channels carry information.

In WDM systems as described above, optical filters, such as optical wavelength demultiplexers, have a very important role. One configuration of the channel dropping systems is shown in FIG. 1 where channels having predetermined frequencies are dropped by a filter 10 from the main signal stream of light A into another light path C (referred to as the dropped channel(s)), and all other channels are transmitted along path B (referred to as the transmitted channels). In this system, the frequencies of the dropped channels are predetermined. If channels at arbitrary frequencies can be dropped, more flexible systems will be built. One of the interesting filters is a wavelength tunable filter, an example of which is shown in FIG. 2. As shown in FIG. 2, wavelength tunable filter 12 drops (or separates out) arbitrary frequencies from the main signal stream of light A to another light path C (referred to as the dropped channel), and transmits the remaining frequencies along path B (referred to as the transmitted channels). An interesting tunable filter is an acousto-optic waveguide filter, which filters frequencies of light from the main stream in response to electric power provided to the acousto-optical waveguide filter. The frequencies of light which are dropped from the main stream are determined by acoustic frequencies which are applied to the device, and, accordingly, may be dynamically altered. If more than one acoustic frequency is applied simultaneously to the wavelength tunable filter, all of the corresponding channels are dropped.

With an acousto-optic waveguide filter, shown in FIG. 2, light wave A, which includes 4 frequencies (or channels) 1, 2, 3, and 4, is input to wavelength tunable filter 12. Wavelength tunable filter 12 drops channel number 3 into path C, while transmitting remaining channels 1, 2, and 4 along output path B. If the wavelength tunable filter 12 of FIG. 2 were, for example, an acousto-optic tunable filter, then the channel dropped along path C would be in response to an output of an acoustic wave generator 14 provided in the filter.

As channels in WDM systems become more closely spaced, demultiplexers have increasing difficultly isolating one or more channels from the other input channels and extracting the selected channel(s). Because the channels are so closely spaced in prior art WDM systems, problems with filtering shape and crosstalk (or leaked light) affect the WDM systems, as do problems with instability of optical power in adjacent channels. Most troublesome in WDM systems of the prior art are problems of crosstalk and instability of optical power in adjacent channels. Problems of crosstalk and instability of optical power most seriously affect the transmitted light, and problems of crosstalk most seriously affect the dropped light, as explained with reference to FIGS. 3A, 3B, 3C, 3D, 3E, 4, and 5.

Problems of filtering shape and of crosstalk in the context of filtering and dropping channels are explained with reference to FIGS. 3A–3E, which respectively show spectrums of light for input channels from which channel 3 is dropped.

FIG. 3A shows an ideal filtering shape surrounding channel 3. An ideal filtering shape F is rectangular, having a flattened top and a base of equal width W with the top of the filtering shape (as shown in FIG. 3B).

However, because of imperfections in conventional filters, an ideal filtering shape is difficult to achieve. Three common problems which occur with conventional filters include providing a filtering shape F with a top that is not flat (FIG. 3C), a filtering shape F with a base (W) considerably wider than the top of the filtering shape F (FIG. 3D), and a filtering shape F filtering an input light wave shifted by a distance S from the center of the spectrum (FIG. 3E).

The example of the filtering shape shown in FIGS. 3C results in a reduced amount of power present in channel 3, and, further, an altered shape of the optical spectrum in channel 3, after filtering. As shown in FIG. 3C, area C has been cut off of channel 3 by the filter F. To compensate for this loss of power, the width of the filter F may be expanded, resulting in crosstalk from adjacent channels 2 and 4, as shown in FIG. 3D. Of course, the shape of the filter F shown in FIG. 3D could have also resulted simply from imperfections in filter F which has a wider base than the top width. Crosstalk C in channel 3 resulting from either of adjacent channels 2 or 4 (crosstalk C is shown in FIG. 3E resulting from adjacent channel 2) also occurs when the center of the spectrum of the input light for channel 3 is shifted a distance S from the center of the spectrum of the filter F. Because of the close proximity of adjacent channels 2 and 4 to channel 3, channel 3 receives crosstalk C upon being filtered.

FIG. 4 shows a spectrum of light transmitted along path B of FIG. 2. If, in the example shown in FIG. 2, channel number 3 is dropped to path C, the output stream B should include only remaining channel numbers 1, 2, and 4. However, as shown in the spectrum of transmitted light of FIG. 4, a small portion of the light in channel number 3 remains and is transmitted along path B. This transmission of a small portion of the light in channel number 3 along path B, even though channel number 3 was dropped into path C, is due to insufficient isolation of channel 3 from channels 1, 2, and 4.

Also as shown in FIG. 4, the optical powers in channels 2 and 4, which are adjacent to channel 3, fluctuate in time and, therefore, provide channels 2 and 4 with instability in their signals. The problem of instability of the optical power due to the dropped channel (such as channel 3) is most acute in the channels adjacent (such as channels 2 and 4) to the dropped channel, but the instability also affects non-adjacent channels (such as channel 1), with decreasing intensity as the distance (in terms of frequency) from the dropped channel increases.

FIG. 5 shows a spectrum of the dropped light transmitted along path C of FIG. 2. As shown in FIG. 5, a problem arises with the dropped channel 3 transmitted along path C because the light dropped into path C includes light power contributions not only from channel 3 (which are desired) but, also, light power contributions from channels other than channel 3 (such as channels 1, 2, and 4). Light power from channels 1, 2, and 4 is undesired and is leaked along path C. The problem of the leaked optical power into the dropped channel (such as channel 3) is most acute in the channels adjacent (such as channels 2 and 4) to the dropped channel, but the leak also occurs in non-adjacent channels (such as channel 1), with decreasing intensity as the distance (in terms of frequency) from the dropped channel increases.

All of the above-mentioned problems are caused by interference between the channels. As shown in FIGS. 4 and 5, and as explained above, the effects on and of channel number 1 are weaker, because the channel position of channel 1 is further from the position of channel 3. A typical isolation of an acousto-optic waveguide filter is ~20 dB for the adjacent channels when the channel spacing is 0.8 nm.

Therefore, filters providing increased isolation between the channels of the input light are desired. Also desired is a WDM system having increased isolation between the channels of the input light, but being of low cost and providing low optical loss.

SUMMARY OF THE INVENTION

An object of the present invention is to increase isolation between channels of input light.

Another object of the present invention is to drop a channel from input light and transmit output light free of crosstalk.

A further object of the present invention is to drop a channel from input light and provide output light free of instability of optical power channels adjacent to a dropped channel.

Yet another object of the present invention is to drop a channel from input light and output the dropped channel free of crosstalk.

To achieve the above-mentioned objects, the present invention is an optical wavelength division multiplexed system using wavelength splitters.

The fundamental idea of the present invention is to split the even channels and the odd channels of the wavelength division multiplexed system into different optical paths, and then insert an optical filter into each optical path.

The optical wavelength division multiplexed system of the present invention receives input light, and splits, using a splitter, odd-numbered channels into one path and even-numbered channels into another, different path.

After the input light (which includes alternating odd- and even-numbered channels adjacent to each other) is split in the present invention, the resulting split light traveling along each path includes only channels which are not directly adjacent to each other, thereby increasing the isolation between the channels.

Then, in the present invention, filters (preferably tunable) placed in each path drop the selected channel(s) from the input, split light, and both the output transmitted channels and the dropped channels are output by the present invention free of crosstalk present in the WDM systems of the prior art. In addition, the output transmitted channels are output by the present invention free of the instability of optical power present in WDM systems of the prior art.

In the present invention, an optical wavelength division multiplexed system comprises a splitter splitting input light into paths, one of the paths including even-numbered channels and another of the paths including odd-numbered channels, each of the paths comprising an optical filter. In another aspect of the present invention, an optical wavelength division multiplexed system comprises a splitter splitting input light into paths in which channels with channel numbers of multiples of 3, channel numbers of multiples of 3 plus 1 (including channel 1), and channel numbers of multiples of 3 plus 2 (including channel 2), are split into different paths, and each of the paths includes an optical filter.

In a further aspect of the present invention, an optical wavelength division multiplexed system comprises splitters splitting input light into paths, in which channels with channel numbers of multiples of 4, channel numbers of multiples of 4 plus 1 (including channel 1), channel numbers of multiples of 4 plus 2 (including channel 2), and channel numbers of multiples of 4 plus 3 (including channel 3), are split into the different paths, and each of the paths includes an optical filter.

In addition, the present invention includes a method of dropping channels carried in input light received by an optical wavelength division multiplexed system. The method of the present invention comprises splitting by the system a portion of the channels into one path within the system and another portion of the channels into another path within the system, such that neither of the paths carry adjacent channels, and dropping by the system one of the channels into a dropped path.

Further, the present invention includes a method of dropping channels carried in input light received by an optical wavelength division multiplexed system. The method of the present invention comprises splitting by the system the channels into at least two, separate paths carrying non-adjacent channels within the system, then dropping by the system one of the channels into a dropped path.

In addition, the present invention includes a method of isolating and dropping channels carried by input light. The method of the present invention comprises splitting by a splitter the channels into separate paths, one of the paths carrying odd-numbered channels and another of the paths carrying even-numbered channels, then dropping by a filter one of the channels into a dropped path.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 7B–7D each show spectrums of light of a channel being filtered, respectively, by conventional filters.

DESCRIPTION OF THE PREFERRED EMBODIMENTS

Figure 6:
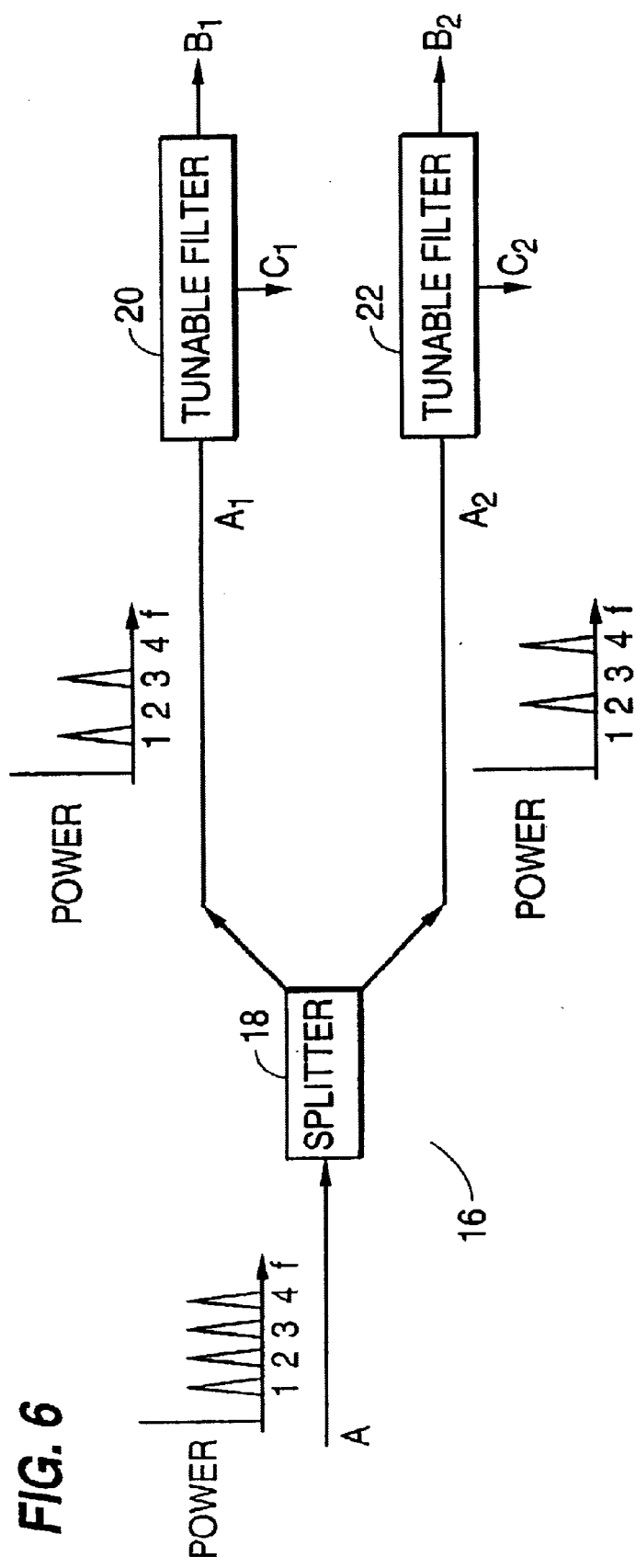
FIG. 6 shows the principles of an optical wavelength division multiplexed system of the present invention.

The principles of the present invention are shown in FIG. 6, which shows optical wavelength division multiplexed system (WDM) 16 of the present invention. In the optical wavelength division multiplexed system 16 of the present invention, input light A including channels 1, 2, 3, 4, . . . is received by splitter 18, which splits (or separates) the input light A into two optical paths $A_1$ and $A_2$. Splitters, which split input light based upon frequencies or wavelengths, are known in the art, and either a conventional splitter, or, preferably, splitters as described herein below, may be used as splitter 18 to split the input light A into channels.

Also as shown in FIG. 6, in the WDM 16 of the present invention, odd channels 1, 3, 5, 7, . . . travel along optical path $A_1$ and enter tunable filter 20. Likewise, even channels 2, 4, 6, 8, . . . travel along optical path $A_2$ and enter tunable filter 22. Although the use of tunable filters is preferable, filters 20 and 22 need not be tunable. Since the channel spacing of the light traveling along either optical path $A_1$ or $A_2$ is doubled as a result of having been split, the isolation between the adjacent channels in each optical path is much higher than in the prior art.

The odd-numbered channels which are dropped are then output by filter 20 along path $C_1$, and the even-numbered channels which are dropped are output by filter 22 along path $C_2$. Likewise, the remaining (or output) odd-numbered channels are output by filter 20 along path $B_1$, while the remaining even-numbered channels are output by filter 22 along path $B_2$.

Using the example put forth with reference to FIGS. 1–5, if channel 3 is the only channel dropped by the WDM 16 of the present invention, then channel 3 is output along path $C_1$, while remaining channels 1, 5, 7, . . . are output along path $B_1$ and remaining channels 2, 4, 6, . . . are output along path $B_2$. In this example, no channels are output along path $C_2$.

Since the channel spacing in WDM 16 of the present invention is twice as large as that in the prior art WDM, there are no channels adjacent to the dropped channel(s), and, accordingly the crosstalk between channels affecting the dropped channel and the remaining channels, and the instability of the optical power in the remaining channels are essentially eliminated. In the example discussed, dropped channel 3 would receive a small amount of crosstalk from remaining channels 1 and 5, and remaining channels 1 and 5 would receive a small amount of crosstalk from dropped channel 3. However, since the distance between dropped channel 3 and each of remaining channels 1 and 5 is a distance of 2 channel spacings, the amount of crosstalk between channels 1 and 3 and between channels 3 and 5 would be small.

Figure 3A:
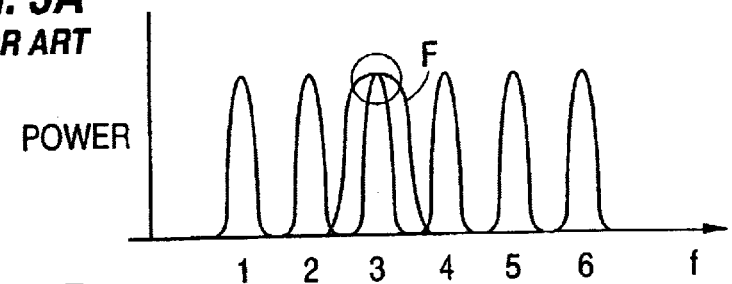
FIG. 3A shows an ideal filtering shape.
Figure 3B:
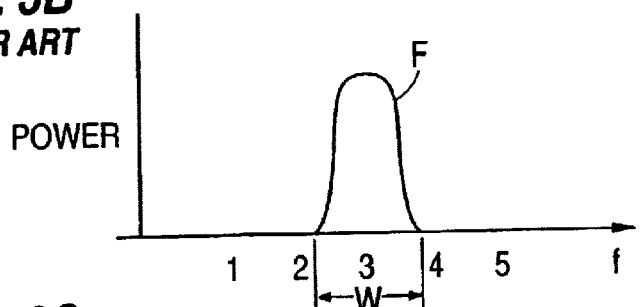
FIG. 3B shows an ideal filtering shape in further detail.
Figure 3C:
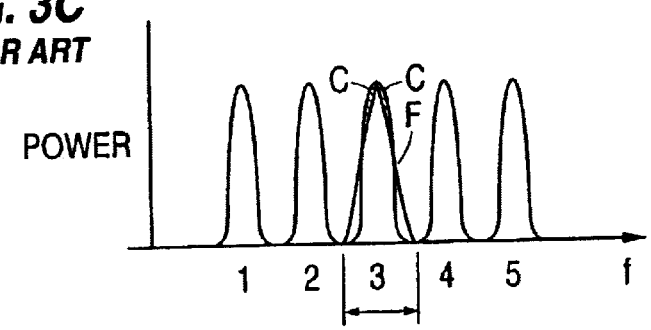
FIGS. 3C, 3D, and 3E show three common problems which occur with conventional filters.
Figure 3D:
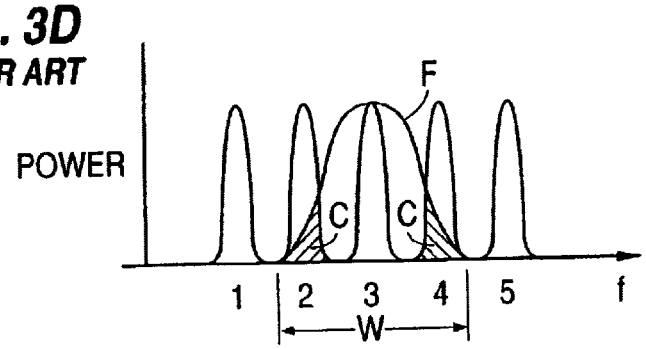
Figure 3E:
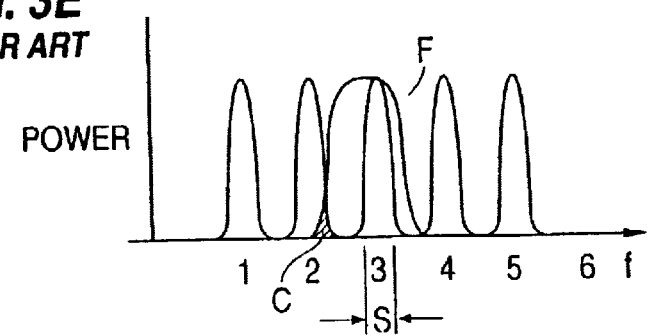
Figure 4:
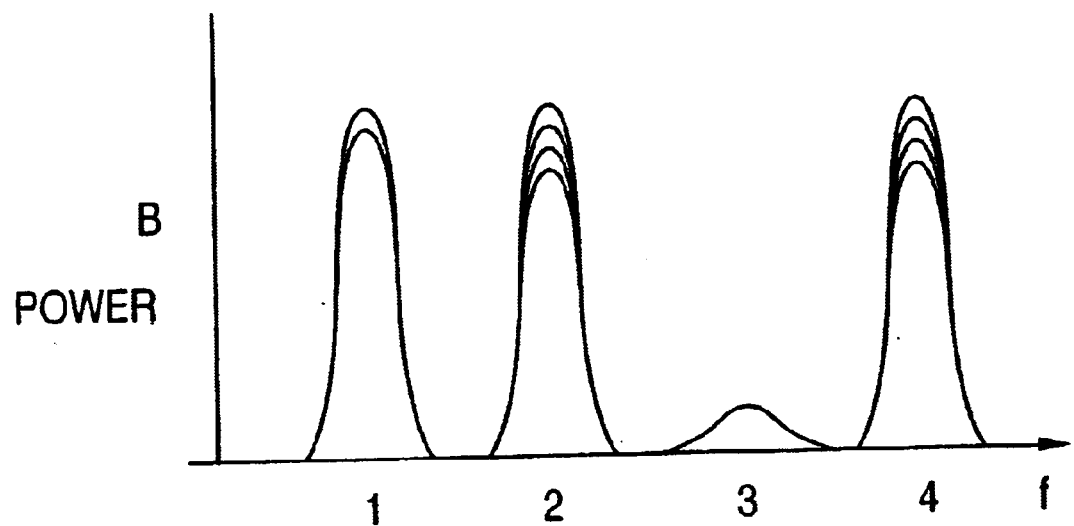
FIG. 4 shows a spectrum of transmitted light in the prior art.
Figure 5:
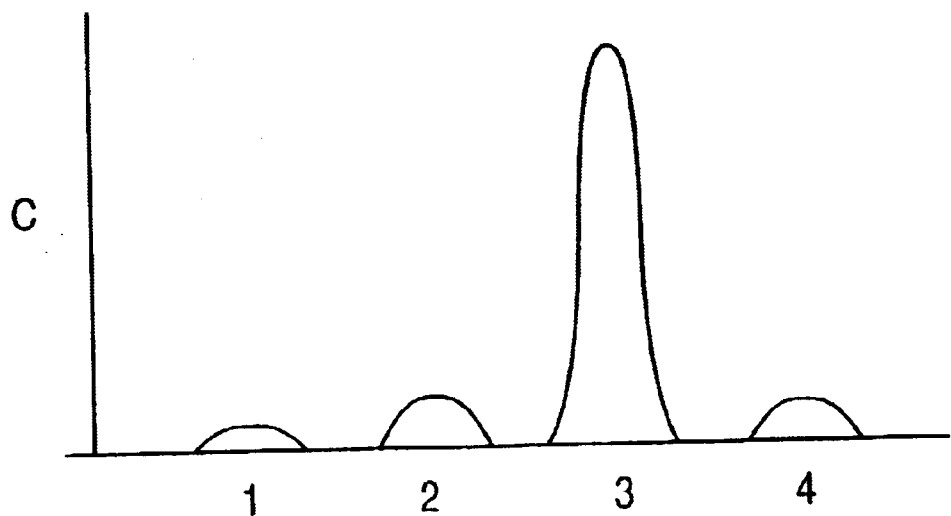
FIG. 5 shows a spectrum of dropped light in the prior art.
Figure 7A:
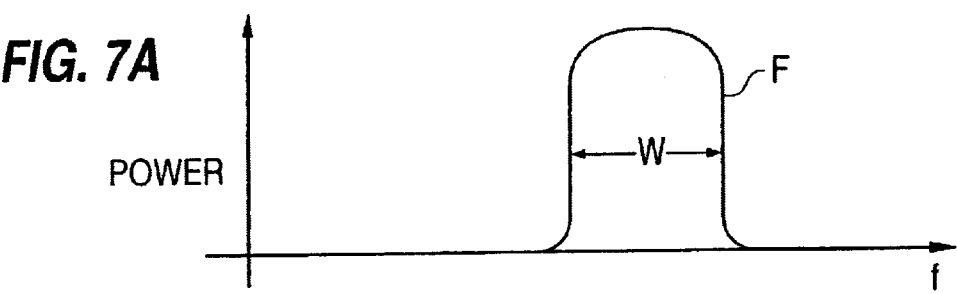
FIG. 7A shows a spectrum of an ideal filter.
Figure 7B:
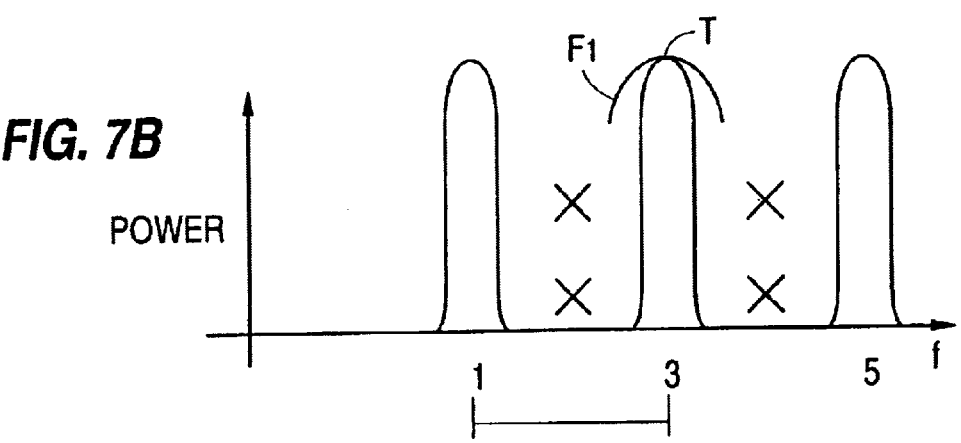
Figure 7C:
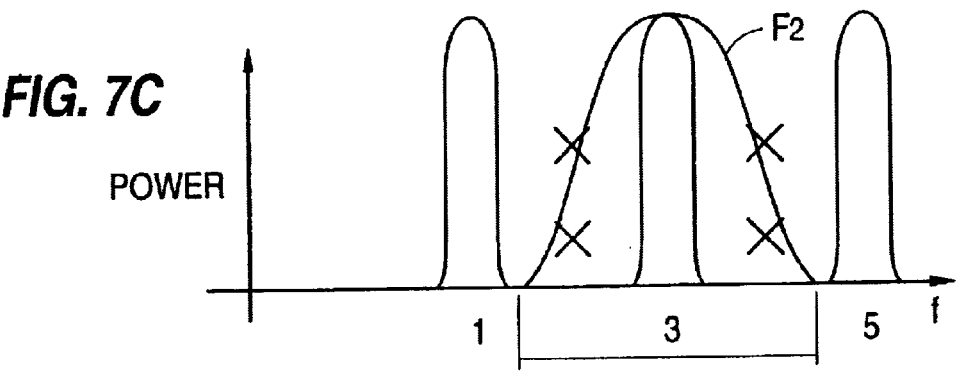
Figure 7C:
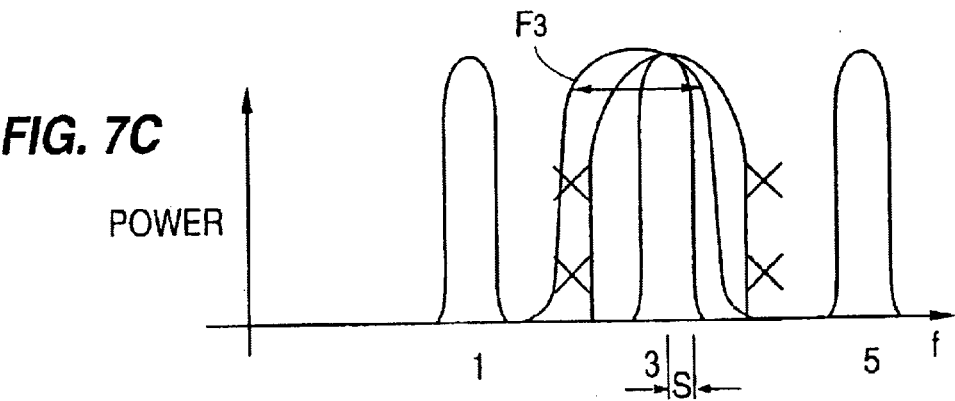

As shown in FIGS. 7A, 7B, 7C, and 7D, the problems of crosstalk and instability of optical power of the prior art WDM systems mentioned with reference to FIGS. 3C–3E are solved by the WDM 16 of the present invention. FIG. 7A shows a spectrum of ideal filter F, being rectangular in shape and having width W consistent between the top and the base of filter F. FIGS. 7B–7D each show spectrums of light of channel 3 only being filtered, respectively, by conventional filters F1, F2, and F3. The shapes of filters F1, F2, and F3 correspond, respectively, to the shapes of the filters shown in FIGS. 3C, 3D, and 3E, and would introduce the problems described in FIGS. 3C, 3D, and 3E into either the dropped channel or the remaining channels or both but for the WDM 16 of the present invention, as explained.

Since the WDM 16 of the present invention, unlike the WDM of the prior art, splits the input channels A into odd-numbered channels $A_1$ and even-numbered channels $A_2$, the next adjacent channel to each channel in channels $A_1$ and $A_2$ is a distance of 2 channels away (in terms of the input channels A).

The principles of the present invention shown in FIGS. 7B–7D are explained with reference to the odd-numbered channels traveling along path $A_1$, but are also applicable to the even-numbered channels traveling along path $A_2$ in the WDM 16 of the present invention.

In the examples shown in FIGS. 7B–7D, channel 3 is being dropped into path $C_1$ by filter 20 of the WDM 16 of the present invention shown in FIG. 6, and channels 1, 5, 7, . . . remain to continue as output transmission channels along path $B_1$. Because the channel spacing in the WDM 16 of the present invention is twice the channel spacing in the WDM of the prior art, the size of the spectrum of the filter F1 corresponding to channel 3 can be larger in the WDM 16 of the present invention than that used in the WDM of the prior art without introducing crosstalk between channels. In FIGS. 7B–7D, X indicates that no optical power is provided at that location. Accordingly, the top T of the filter F1 is relatively flatter for a filter F shown in FIG. 3C. Therefore, a reduction in the power of channel 3, after being dropped, would not occur as readily in the WDM 16 of the present invention as in the WDM of the prior art.

Likewise, as shown in FIG. 7C, the width W of the base of the filter F2 used in the WDM 16 of the present invention could be wider than the width W of the base of the filter used in the WDM of the prior art without introducing crosstalk or instability of optical power into adjacent channels because the channel spacing between the channels being filtered in the WDM 16 of the present invention is twice as large as the channel spacing between the channels being filtered in the WDM of the prior art.

In addition, as shown in FIG. 7D, since the channel spacing between the channels being filtered in the WDM 16 of the present invention is twice as large as the channel spacing between the channels being filtered in the WDM of the prior art, filter F3 used in the WDM 16 of the present invention can be broader than the filter used in the WDM of the prior art without introducing crosstalk or instability of optical power into adjacent channels. Therefore, even if the center of the spectrum for channel 3 is shifted by a distance S from the center of the spectrum for filter F3, filter F3 still covers the spectrum for channel 3 in the WDM 16 of the present invention.

Figure 1:
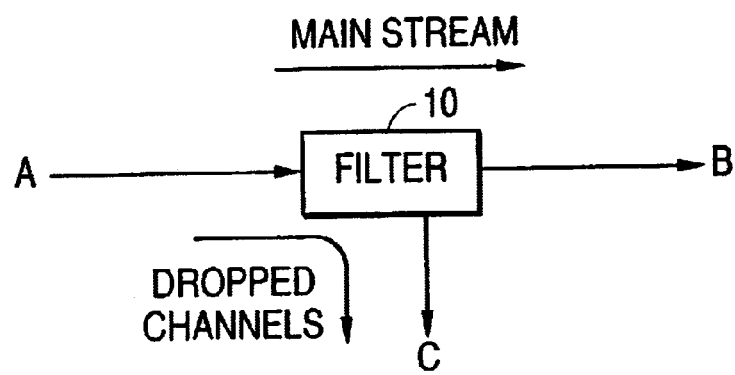
FIG. 1 shows a channel dropping filter of the prior art.
Figure 2:
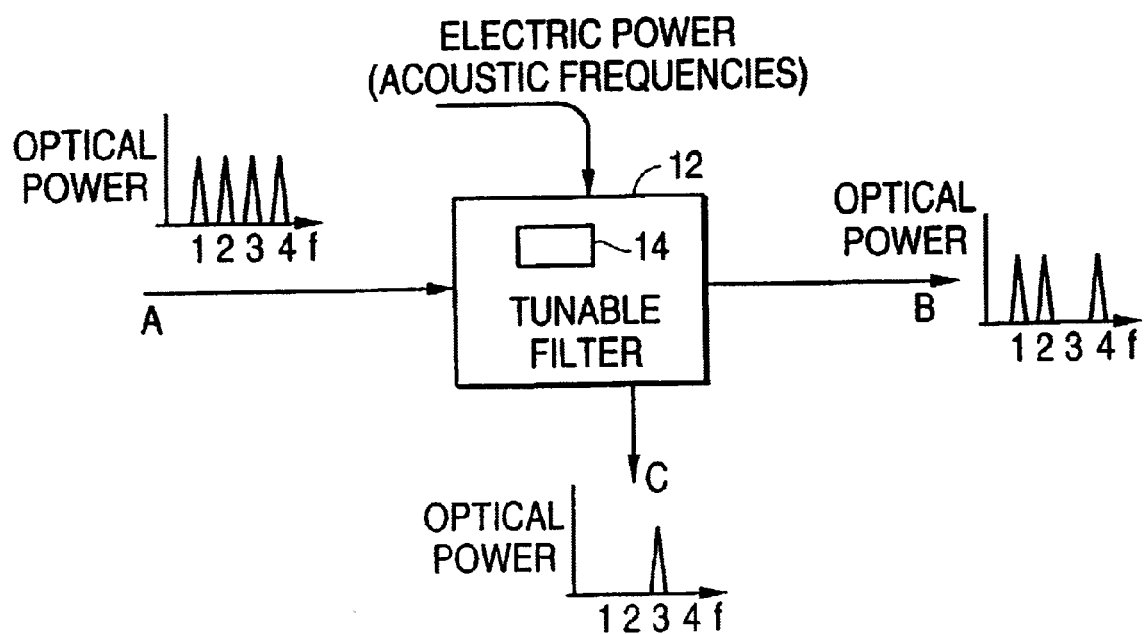
FIG. 2 shows a wavelength tunable filter of the prior art.
Figure 8:
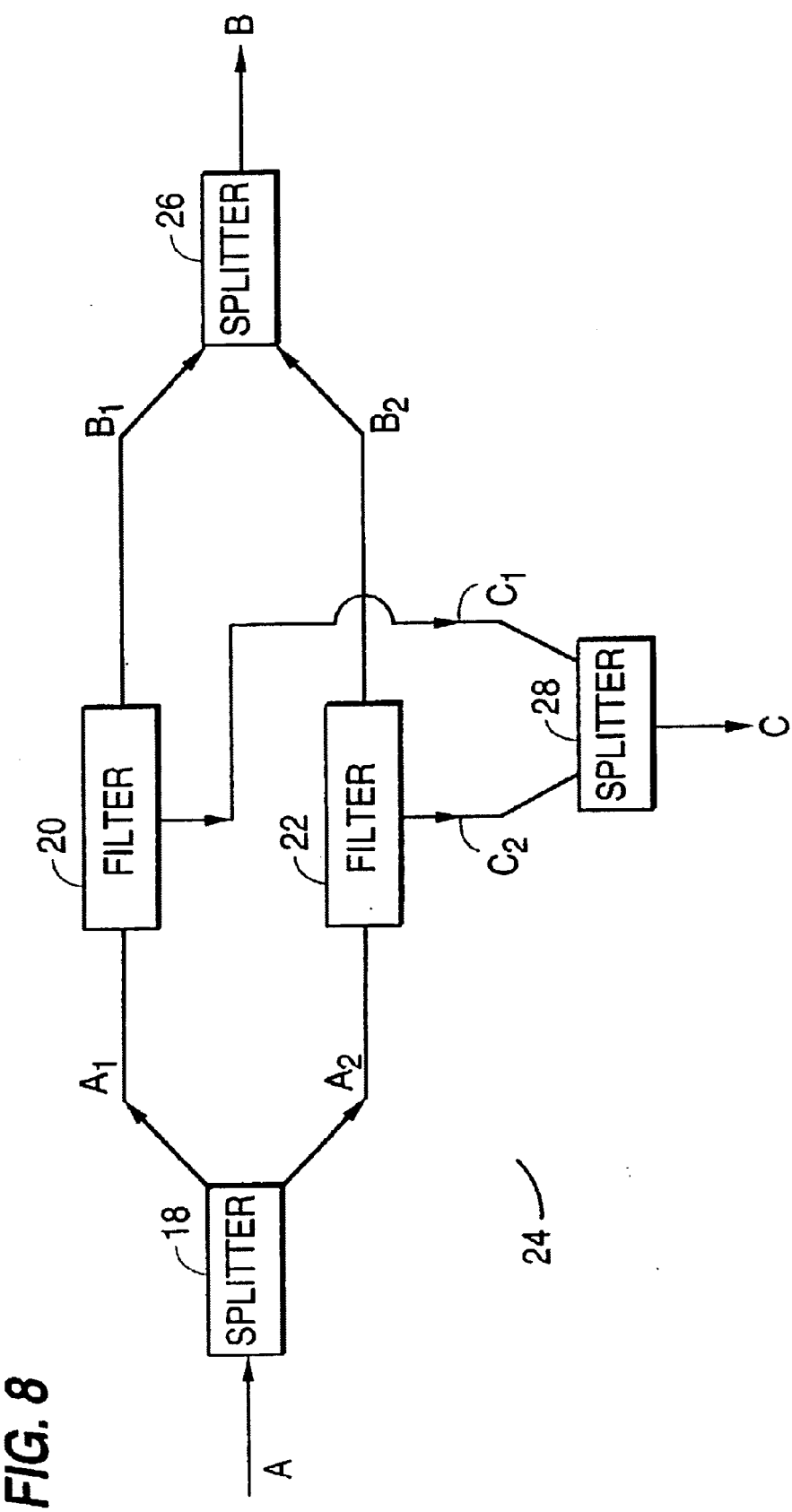
FIG. 8 shows an optical wavelength division multiplexed (WDM) system 24 of the present invention.

For the WDM 16 of the present invention shown in FIG. 6 to achieve the same function as shown in FIG. 2, the output light $B_1$ and $B_2$ from filters 20 and 22, respectively, must be combined using splitter 26, and, likewise, the dropped light $C_1$ and $C_2$ from filters 20 and 22, respectively, must be combined using splitter 28 as shown in the WDM 24 of the present invention in FIG. 8.

FIG. 8 shows an optical wavelength division multiplexed (WDM) system 24 of the present invention which achieves the same function as the prior art apparatus shown in FIG. 2, but, further, includes the advantages of the WDM 16 of the present invention shown in FIG. 6. In the WDM system 24 of the present invention, each filter 20, 22 receives only every other channel. The WDM 24 of the present invention includes a splitter 18 (as described herein above with reference to FIG. 6) and filters 20 and 22 (also as described herein above with reference to FIG. 6).

More particularly in the WDM 24 of the present invention, filter 20 would receive from path $A_1$ channels 1, 3, 5, 7, .... Likewise, filter 22 would receive from path $A_2$ channels 2, 4, 6, 8 .... Therefore, in the WDM 24 of the present invention shown in FIG. 8, the next adjacent channel to any particular channel, after the input light A has been split by splitter 18, is effectively a distance of two channels away from the particular channel.

Thereafter, channels from path $A_1$ (which would include odd-numbered channels only) dropped by filter 20 travel along path $C_1$, and channels from path $A_1$ (which would also include odd-numbered channels only) remaining (or not dropped) by filter 20 travel along path $B_1$. Likewise, channels from path $A_2$ (which would include even-numbered channels only) dropped by filter 22 travel along path $C_2$, and channels from path $A_2$ (which would also include even-numbered channels only) remaining (or not dropped) by filter 22 travel along path $B_2$.

Then, the WDM 24 of the present invention recombines the channels traveling along paths $C_1$ and $C_2$ by splitter 28 into dropped channels traveling along path C. Further, the WDM 24 of the present invention recombines the channels traveling along paths $B_1$ and $B_2$ by splitter 26 into remaining, transmitted output channels traveling along path B.

The following examples further explain the above-mentioned concepts of the WDM 24 of the present invention shown in FIG. 8. If input light A includes channels 1, 2, 3, 4, 5, 6, 7, 8, ..., then splitter 18 splits the input light A into channels 1, 3, 5, 7, ... traveling along path $A_1$, and channels 2, 4, 6, 8 ... traveling along path $A_2$.

If only channel 3 is to be dropped, then filter 20 drops channel 3 into path $C_1$, and allows remaining channels 1, 5, 7, ... to continue along path $B_1$ to splitter 26. Filter 22 does not drop any of channels 2, 4, 6, 8, ... into path $C_2$, but allows all channels 2, 4, 6, 8, ... to continue along path $B_2$ to splitter 26. When splitter 26 recombines the light traveling along paths $B_1$ and $B_2$, the resultant output light B includes channels 1, 2, 4, 5, 6, 7, 8, .... When splitter 28 recombines the light traveling along paths $C_1$ and $C_2$, the resultant dropped light C includes only channel 3.

On the other hand, if both channels 3 and 6 are to be dropped, then filter 20 drops channel 3 into path $C_1$, and allows remaining channels 1, 5, 7, ... to continue along path $B_1$ to splitter 26. Filter 22 drops channel 6 into path $C_2$, and allows channels 2, 4, 8, ... to continue along path $B_2$ to splitter 26. When splitter 26 recombines the light traveling along paths $B_1$ and $B_2$, the resultant output light B includes channels 1, 2, 4, 5, 7, 8 .... When splitter 28 recombines the light traveling along paths $C_1$ and $C_2$, the resultant dropped light C includes channels 3 and 6.

The above-mentioned scheme of isolating channels in WDM 24 of the present invention can be extended. In a WDM of the present invention, there are multiple ways in which the channels could be divided. One way would be to have an optical wavelength division multiplexed system including a splitter splitting input light into paths, in which the channels with the channel numbers of multiple of 3, the channel numbers of multiple of 3 plus 1 (including channel 1), and the channel numbers of multiple of 3 plus 2 (including path 2), are split into different paths, and each path includes an optical filter.

Another way of dividing the channels in the optical wavelength division multiplexed system of the present invention includes splitters splitting input light into paths, in which channels with channel numbers of multiples of 4, channel numbers of multiples of 4 plus 1 (including channel 1), channel numbers of multiples of 4 plus 2 (including channel 2), and channel numbers of multiples of 4 plus 3 (including channel 3), are split into the different paths, and each of the paths includes an optical filter.

Figure 9:
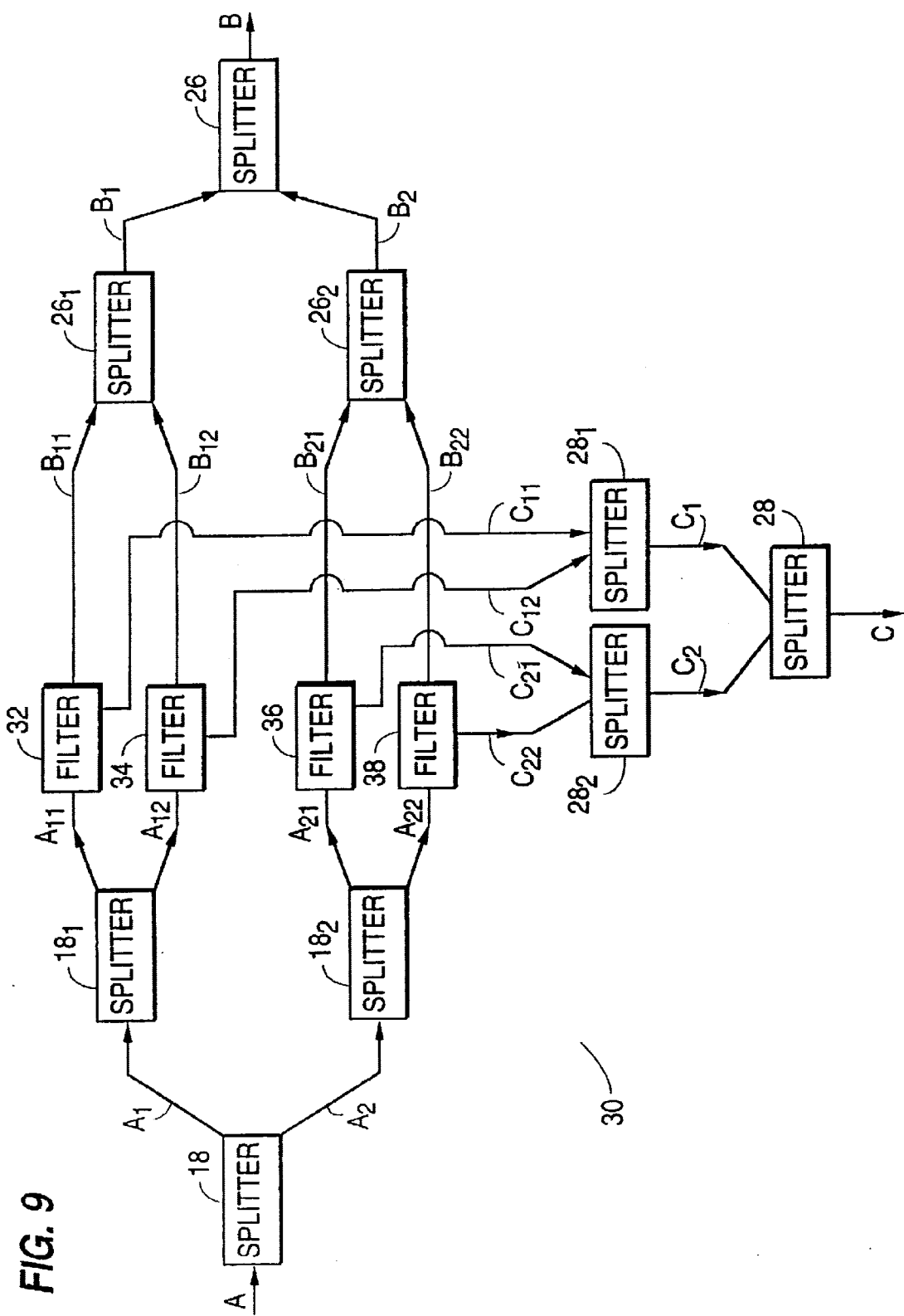
FIG. 9 illustrates an optical wavelength division multiplexed system (WDM) 30 with splitter of the present invention.

FIG. 9 illustrates an extended scheme of the present invention in which an optical wavelength division multiplexed system (WDM) 30 with splitter of the present invention includes multiple splitters which split channels included in input light A multiple times into multiple paths. Each path includes a filter.

In the WDM 30 of FIG. 9, the channel numbers which are multiples of 4 plus 1 travel to a first arm (or path) $A_{11}$, the channel numbers which are multiples of 4 plus 3 travel to a second arm (or path) $A_{12}$, the channel numbers which are multiples of 4 plus 2 travel to a third arm (or path) $A_{21}$, and the channel numbers which are multiples of 4 travel to a fourth arm (or path) $A_{22}$. With this scheme, the effective channel spacing in each arm is four times larger than in prior art systems. This further increases the isolation between channels over the prior art systems.

As in the WDM 24 of FIG. 8, in the WDM 30 of FIG. 9, splitter 18 splits input light A into two different paths, with alternate channels allocated to the different paths. Since there are two layers of splitters in the WDM 30, the input light A (including channels 1, 2, 3, 4, 5, 6, 7, 8, 9, 10, 11, 12, ... ) is divided first into channels 1, 3, 5, 7, 9, ... traveling along path A, and channels 2, 4, 6, 8, 10, 12, ... traveling along path $A_2$ by splitter 18.

Next, channels 1, 3, 5, 7, 9, 11, ... are divided by splitter $18_1$ into channels 1, 5, 9, ... traveling along path $A_{11}$ and channels 3, 7, 11, ... traveling along path $A_{12}$. Likewise, channels 2, 4, 6, 8, 10, 12, ... are divided by splitter $18_2$ into channels 2, 6, 10, ... traveling along path $A_{21}$ and channels 4, 8, 12, ... traveling along path $A_{22}$.

Filters 32, 34, 36, and 38 then drop channels as in the WDM 24 of the present invention described with reference to FIG. 8. More particularly, filter 32 would drop any of channels 1, 5, 9, ... into path $C_{11}$; filter 34 would drop any of channels 3, 7, 11, ... into path $C_{12}$; filter 36 would drop any of channels 2, 6, 10, ... into path $C_{21}$; and filter 38 would drop any of channels 4, 8, 12, ... into path $C_{22}$.

In addition, filter 32 would allow any of remaining channels 1, 5, 9, ... to pass through into path $B_{11}$; filter 34 would allow any of remaining channels 3, 7, 11, . . . to pass through into path $B_{12}$; filter 36 would allow any of remaining channels 2, 6, 10, . . . to pass through into path $B_{21}$; and filter 38 would allow any of remaining channels 4, 8, 12, . . . to pass through to path $B_{22}$.

Paths $B_{11}$ and $B_{12}$ are then recombined into path $B_1$ by splitter $26_1$; paths $B_{21}$ and $B_{22}$ are recombined into path $B_2$ by splitter $26_2$; and paths $B_1$ and $B_2$ are recombined into path B (the output light) by splitter 26.

Likewise, paths $C_{11}$ and $C_{12}$ are then recombined into path $C_1$ by splitter $28_1$; paths $C_{21}$ and $C_{22}$ are recombined into path $C_2$ by splitter $28_2$; and paths $C_1$ and $C_2$ are recombined into path C (the dropped light) by splitter 28.

In the WDM 30 of the present invention shown in FIG. 9, the channel spacing at the filters which drop the channels is four times as large as in the prior art WDM system.

Extending the example discussed with reference to the WDM 24 of the present invention shown in FIG. 8 to the WDM 30 of the present invention shown in FIG. 9, if channel 3 were to be dropped, then channel 3 would travel along paths $A_1$ then $A_{12}$, and be dropped by filter 34 into path $C_{12}$. If channel 6 were to be dropped, then channel 6 would travel along paths $A_2$ then $A_{21}$, and be dropped into path $C_{21}$ by filter 36. The remaining channels 1, 2, 4, 5, 7, 8, 9, . . . would continue and be output along path B consistent with the logic discussed herein above.

Because the separation between channels at filters 32, 34, 36, and 38 is even greater in the WDM 30 of the present invention than the separation between channels being filtered in the prior art, the requirements for the spectrum shape of the filters are less stringent and easier to achieve.

As discussed herein above, FIGS. 6 and 8 show the fundamental scheme of the present invention. However, isolation of the filters may have an upper limit regardless of the channel spacing. In such a case, the tunable filters may be cascaded to increase the isolation of the channels. This scheme of the present invention is shown in FIG. 10, in which filters are cascaded both in the main light transmission stream and in the dropped path.

Figure 10:
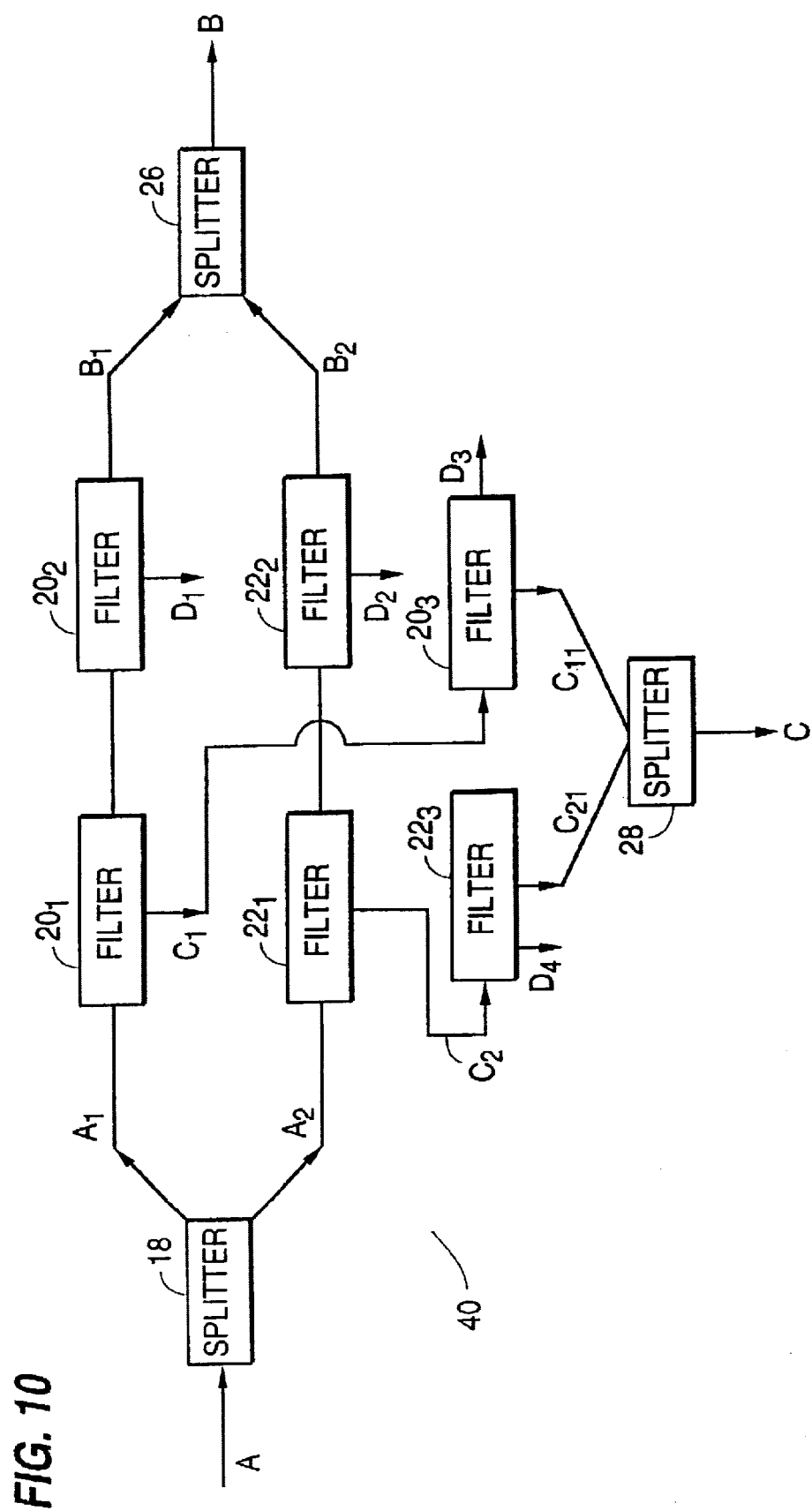
FIG. 10 shows an optical wavelength division multiplexed system (WDM) 40 of the present invention with splitters and cascaded filters.

FIG. 10 shows an optical wavelength division multiplexed system (WDM) 40 of the present invention with splitters and cascaded filters. In the WDM 40 of the present invention, the filters are cascaded to increase channel isolation. The WDM 40 of the present invention shown in FIG. 10 is based on the WDM 24 of the present invention shown in FIG. 8. In both the WDM 24 and the WDM 40, the channel spacing is double the channel spacing in the prior art for the light being filtered. As in the WDM 24 of FIG. 8, in the WDM 40 of FIG. 10, the incoming light A (including channels 1, 2, 3, 4, 5, 6, 7, 8, 9, . . . ) is split by splitter 18 into light traveling along optical path $A_1$ (channels 1, 3, 5, 7, 9, . . . ) and light traveling along optical path $A_2$ (channels 2, 4, 6, 8, 10, . . . ).

Continuing in FIG. 10 with the examples discussed previously herein above, if channel 3 is to be dropped, then filter $20_1$ drops channel 3 into path $C_1$, and allows channels 1, 5, 7, 9, . . . to continue to filter $20_2$. Even though the channel isolation in WDM 40 (and in WDM 24) of the present invention is double the channel isolation in the prior art, there is still a small amount of leaked light (for example, 1%) of the dropped channel (channel 3 in the current example) that continues past filter $20_1$ to filter $20_2$, with 99% of the power in the dropped channel 3 being dropped into path $C_1$. Filter $20_2$, though, allows only 1% (for example) of the 1% of the power from dropped channel 3 to continue to path $B_1$, with the filtered power from channel 3 continuing along path $D_1$. Therefore, optical path $B_1$ includes in light 1, 5, 7, 9, . . . only 1% of 1% (or $10^{-4}$) of the power of dropped channel 3. Therefore, the crosstalk from dropped channel 3 is reduced by a factor of two in decibels (dB, or by the square in actual power) in path $B_1$.

The same would also be true for any other dropped channels, for example channel 6 (which would be dropped by filter $22_1$ and $22_2$). Paths $B_1$ and $B_2$ are then recombined by splitter 26, and output as B, with channels 1, 2, 4, 5, 7, 8, 9, 10, . . . ; any further filtered power from channel 6 would continue along path $D_2$.

From the perspective of the channel being dropped, perhaps 1% of the power from each of the next adjacent channels (in this example, channels 1 and 5) to the dropped channel 3 is also dropped into path $C_1$. Filter $20_3$ allows only 1% of the 1% (or $10^{-4}$) of the power from each of channels 1 and 5 to pass to path $C_{11}$, with the filtered power following path $D_3$.

Channel 6 would be dropped into path $C_2$ by filter $22_1$, which path would also receive perhaps 1% of the power from each of next adjacent channels 4 and 8. Then, filter $22_3$ would allow only 1% of the 1% of the power received by path $C_2$ from each of next adjacent channels 4 and 8 to pass to path $C_{21}$. The power from channels 4 and 8 filtered out by filter $22_3$ would then continue along path $D_4$.

Paths $C_{11}$ and $C_{21}$ are then recombined by splitter 28 into path C.

It is important for filters $20_1$, $20_2$, and $20_3$ to be the same since those filters are all filtering the same channel(s). Likewise, it is important for filters $22_1$, $22_2$, and $22_3$ to be the same since those filters are all filtering the same channel(s), as well. Filters $20_n$ (where n=1, 2, or 3) are unlikely to be the same as filters $22_n$ (also where n=1, 2, or 3).

Both the WDM 30 of the present invention and the WDM 40 of the present invention emphasize features of their own. The WDM 30 of the present invention provides effective channel spacing (4 times that of the prior art), and the WDM 40 with cascaded filters reduces crosstalk between channels. The foregoing features of the WDM 30 and the WDM with cascaded filters 40 are combined into the WDM 42 shown in FIG. 11. The WDM 42 shown in FIG. 11 includes 4 paths, and all 4 paths include cascaded filters.

Figure 11:
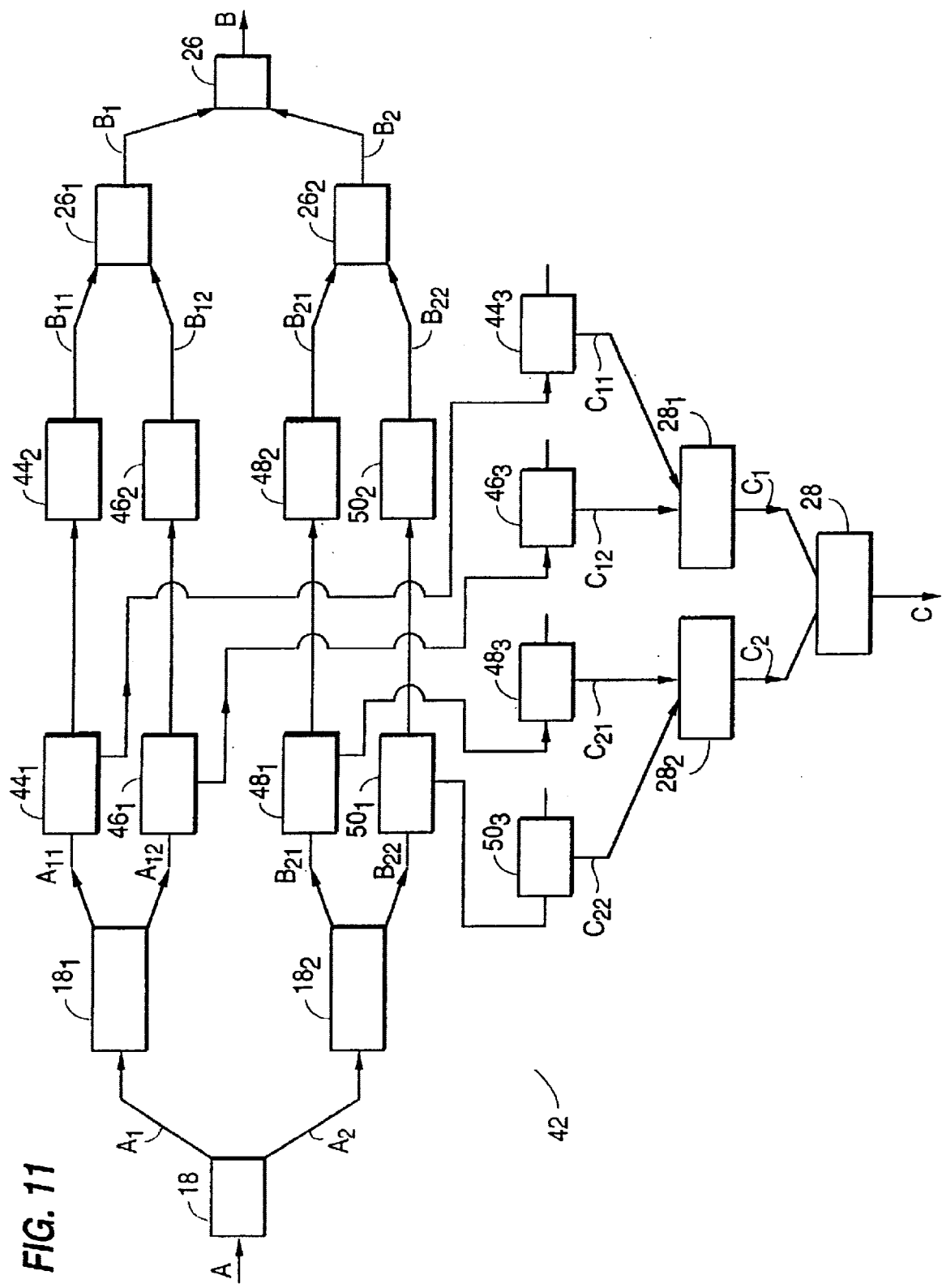
FIG. 11 shows an optical wavelength division multiplexed system 42 with 4 paths, each with cascaded filters.

The pathways and logic followed by each of the channels 1, 2, 3, 4, 5, 6, 7, 8, 9, . . . included in input light A in WDM 42 shown in FIG. 11 are consistent with the pathways and logic followed by each of the channels 1, 2, 3, 4, 5, 6, 7, 8, 9, . . . included in input light A in WDM 30 of the present invention shown in FIG. 9. However, as in the case of the WDM 40 of the present invention shown in FIG. 10, each channel in WDM 42 of the present invention shown in FIG. 11 is acted upon (filtered or allowed to pass) by two, cascaded filters. Therefore, the WDM 42 of the present invention isolates each channel included in input light A from its next adjacent channel by a distance of four channels when first input to a filter as in the WDM 30 of the present invention, and, further, reduces the crosstalk between dropped and remaining (non-dropped) channels by a factor of 2 in dB or by squared in terms of power as in the WDM 40 of the present invention.

Referring now to FIG. 11, input light A includes channels 1, 2, 3, 4, 5, 6, 7, 8, 9, 10, 11, 12, . . . , and is split into paths $A_1$ (including channels 1, 3, 5, 7, 9, 11, . . . ) and $A_2$ (including channels 2, 4, 6, 8, 10, 12, . . . ) by splitter 18. Splitter $18_1$ then splits the light traveling in path $A_1$ into paths $A_{11}$ (including channels 1, 5, 9, . . . ) and $A_{12}$ (including paths 3, 7, 11, . . . ). Likewise, splitter $18_2$ splits the light traveling in path $A_2$ into paths $A_{21}$ (including channels 2, 6, 10, . . . ) and $A_{22}$ (including paths 4, 8, 12, . . . ).

The channels traveling in path $A_{11}$ are then acted upon (i.e., the channel(s) are either dropped by the filter or allowed to pass through the filter) by cascaded filters $44_1$ and $44_2$, with channel(s) dropped by filter $44_1$ into path $C_{11}$ being acted upon by filter $44_3$. The channels remaining (not dropped) from input path $A_{11}$ are output from filters $44_1$ and $44_2$ along path $B_{11}$. To most effectively reduce crosstalk and increase channel isolation, filters $44_n$ (where n=1, 2, and 3) must have the same filtering characteristics (i.e., must drop the same channel(s)).

Filters $44_1$ and $44_2$ are cascaded in that the output of filter $44_1$ is directly input into filter $44_2$ (filters $44_1$ and $44_2$ are connected in series) and each of the non-dropped (or remaining) channels passes through each of filters $44_1$ and $44_2$. Filters $44_1$ and $44_3$ are cascaded in that the output of filter $44_1$ is directly input into filter $44_3$ (filters $44_1$ and $44_3$ are connected in series) and each of the dropped channels passes through each of filters $44_1$ and $44_3$.

Likewise, the channels traveling in path $A_{12}$ are acted upon by cascaded filters $46_1$ and $46_2$, with channel(s) dropped by filter $46_1$ into path $C_{12}$ being acted upon by filter $46_3$. The channels remaining (not dropped) from input path $A_{12}$ are output from filters $46_1$ and $46_2$ along path $B_{12}$. To most effectively reduce crosstalk and increase channel isolation, filters $46_n$ (where n=1, 2, and 3) must have the same filtering characteristics (i.e., must drop the same channel(s)).

Filters $46_1$ and $46_2$ are cascaded in that the output of filter $46_1$ is directly input into filter $46_2$ (filters $46_1$ and $46_2$ are connected in series) and each of the non-dropped (or remaining) channels passes through each of filters $46_1$ and $46_2$. Filters $46_1$ and $46_3$ are cascaded in that the output of filter $46_1$ is directly input into filter $46_3$ (filters $46_1$ and $46_3$ are connected in series) and each of the dropped channels passes through each of filters $46_1$ and $46_3$.

The light traveling in paths $B_{11}$ and $B_{12}$ is then recombined by splitter $26_1$ into path $B_1$.

The channels traveling in path $A_{21}$ are acted upon by cascaded filters $48_1$ and $48_2$, with channel(s) dropped by filter $48_1$ into path $C_{21}$ being acted upon by filter $48_3$. The channels remaining (not dropped) from input path $A_{21}$ are output from filters $48_1$ and $48_2$ along path $B_{21}$. To most effectively reduce crosstalk and increase channel isolation, filters $48_n$ (where n=1, 2, and 3) must have the same filtering characteristics (i.e., must drop the same channel(s)).

Filters $48_1$ and $48_2$ are cascaded in that the output of filter $48_1$ is directly input into filter $48_2$ (filters $48_1$ and $48_2$ are connected in series) and each of the non-dropped (or remaining) channels passes through each of filters $48_1$ and $48_2$. Filters $48_1$ and $48_3$ are cascaded in that the output of filter $48_1$ is directly input into filter $48_3$ (filters $48_1$ and $48_3$ are connected in series) and each of the dropped channels passes through each of filters $48_1$ and $48_3$.

Likewise, the channels traveling in path $A_{22}$ are then acted upon by cascaded filters $50_1$ and $50_2$, with channel(s) dropped by filter $50_1$ into path $C_{22}$ being acted upon by filter $50_3$. The channels remaining (not dropped) from input path $A_{22}$ are output from filters $50_1$ and $50_2$ along path $B_{22}$. To most effectively reduce crosstalk and increase channel isolation, filters $50_n$ (where n=1, 2, and 3) must have the same filtering characteristics (i.e., must drop the same channel(s)).

Filters $50_1$ and $50_2$ are cascaded in that the output of filter $50_1$ is directly input into filter $50_2$ (filters $50_1$ and $50_2$ are connected in series) and each of the non-dropped (or remaining) channels passes through each of filters $50_1$ and $50_2$. Filters $50_1$ and $50_3$ are cascaded in that the output of filter $50_1$ is directly input into filter $50_3$ (filters $50_1$ and $50_3$ are connected in series) and each of the dropped channels passes through each of filters $50_1$ and $50_3$.

The light traveling in paths $B_{21}$ and $B_{22}$ is then recombined by splitter $26_2$ into path $B_2$.

The light traveling in paths $B_1$ and $B_2$ is recombined by splitter 26 into path B.

Likewise, the dropped light traveling in paths $C_{11}$ and $C_{12}$ is recombined by splitter $28_1$ into path $C_1$; the dropped light traveling in paths $C_{21}$ and $C_{22}$ is recombined by splitter $28_2$ into path $C_2$; and the dropped light traveling in paths $C_1$ and $C_{12}$ is recombined by splitter 28 into path C.

If channel 3, for example, were selected as the dropped channel, then channel 3 would travel along path $A_1$, then path $A_{21}$, then be dropped into path $C_{21}$ by filter $48_1$. Perhaps, though, 1% of the power of channel 3 continues along with remaining channels 7, 11, . . . . Then filter $48_2$ would allow only 1% of the 1% (or $10^{-4}$) of the power from channel 3 to continue along path $B_{21}$ at the output of filter $48_2$. Likewise, filter $48_3$ would reduce the amount of power included in any non-dropped channels erroneously traveling in path $C_{21}$ by an additional (for example) $10^{-2}$ (which power was already reduced by $10^{-2}$ by filter $48_1$), so that only $10^{-4}$ of the power of the non-dropped channels input to filter $48_1$ is output by filter $48_3$.

Figure 12:
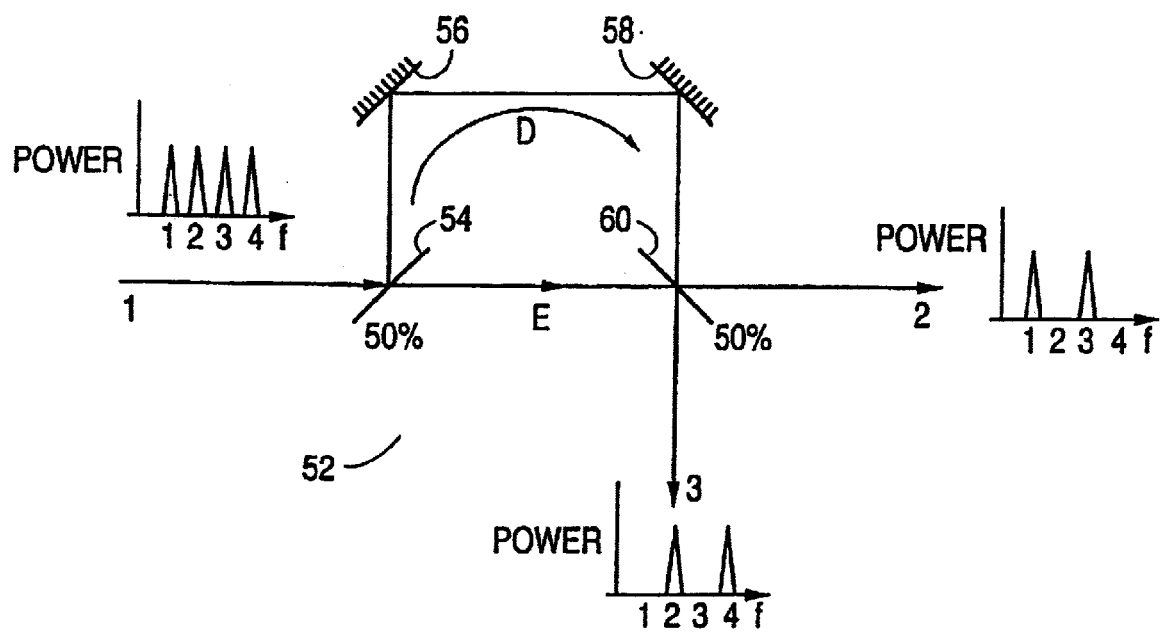
FIG. 12 shows a Mach-Zehnder interferometer with asymmetric arm lengths of the prior art.

In the present invention, the splitter is an important device. One structure which can be used as a splitter to split the even channels and the odd channels is a Mach-Zehnder interferometer with asymmetric arm lengths, as shown in FIG. 12. Mach-Zehnder interferometers with asymmetric arm lengths, generally, are well-known in the art, and the difference in the arm lengths of the Mach-Zehnder interferometer shown in FIG. 12 determines the channel spacing. In addition, 50/50 couplers are well-known in the art.

As shown in FIG. 12, input light 1 (including channels 1, 2, 3, 4, . . . ) is input to the Mach-Zehnder interferometer 52 of FIG. 12. The input light 1 is then directed by conventional 50/50 coupler 54 along paths D and E.

Along path D, the input light 1 is reflected by mirrors 56 and 58 to 50/50 coupler 60. Along path E, the input light 1 travels directly to 50/50 coupler 60. Then, 50/50 coupler recombines the light traveling in paths D and E to produce output light 2 (including only channels 1, 3, . . . ) and output light 3 (including only channels 2, 4, . . . ). The relative phase of the light at 50/50 coupler 60 determines the channels output along output path 2 and output path 3, using the formulas of:

$$\text{relative phase, } \theta = ((2 * \pi * n * f)/c) * (D_D - D_E) \quad (1)$$

$$\text{and output power} = \tfrac{1}{2} + \tfrac{1}{2} \cos \theta \quad (2)$$

where $D_D$ is the distance along path D, $D_E$ is the distance along path E, n is the refractive index (1 for air), f is the frequency of the input light 1, c is the speed of light, and $\pi$ is 3.14 . . . .

The above-mentioned formulas (1) and (2) also determine the period of the output light, and, by changing $(D_D - D_E)$, the period of the output light with respect to the frequency f can be changed to match twice the channel spacing.

Figure 13:
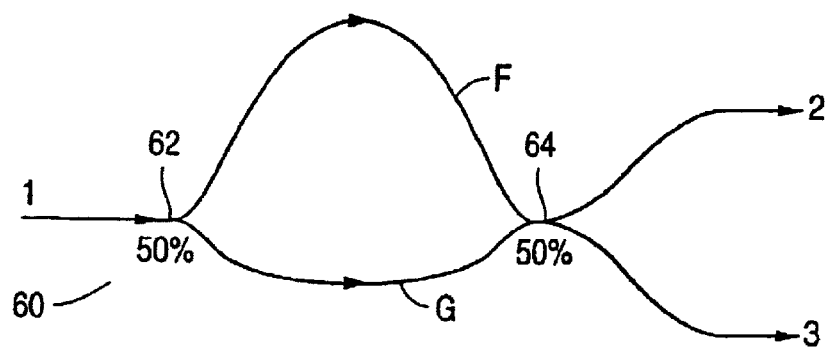
FIG. 13 shows a waveguide device of the prior art.

Waveguides, generally, are known in the art. The splitter could, alternatively, be constructed as a waveguide device 60 with the shape shown in FIG. 13 and having the same mathematics as the Mach-Zehnder interferometer 52 shown in FIG. 12. The waveguide device 60 shown in FIG. 13 is an asymmetric waveguide or fiber scheme in which input light 1 is input to 50/50 coupler 62, travels along paths F and G of different lengths, and is recombined by 50/50 coupler 64 to produce outputs 2 and 3, consistent with the above-mentioned discussion with reference to FIG. 12.

Figure 14:
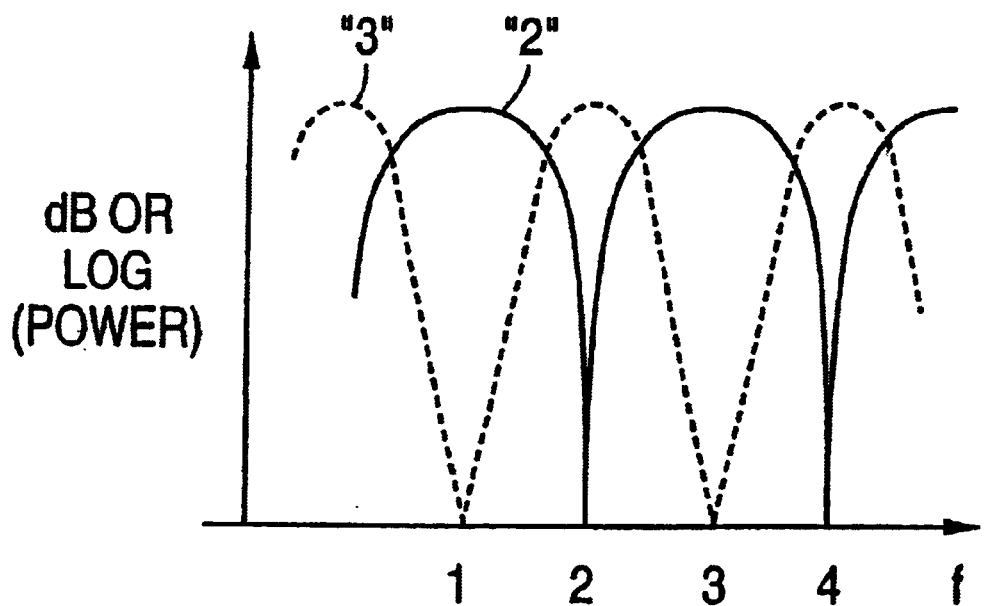
FIG. 14 shows a typical spectrum in one of two outputs of a Mach-Zehnder interferometer.

One disadvantage of the Mach-Zehnder type of interferometer or splitter is that the filtering spectrum is not sharp. Typical spectra in two outputs of a Mach-Zehnder interferometer are shown by the solid line "2" and the dotted line "3", respectively, in FIG. 14. The spectrum shown by the solid line "2" in FIG. 14 is of transmissivity (dB or log (power) vs. frequency); the channels with the odd numbers should be transmitted (such as in output "2" of FIGS. 12 and 13) and the channels with the even numbers should be rejected in this output (such as in output "3" of FIGS. 12 and 13). But the rejection bandwidth (the bandwidth in the spectrum in which light power is rejected) is narrow and the light from the even numbered channels will leak into the output. Although the output shown in FIG. 14 is periodic, the output is not rectangular, meaning that crosstalk between channels is likely to be present. A rectangular output, having a broad bottom, is needed to ensure that crosstalk is avoided.

Figure 15:
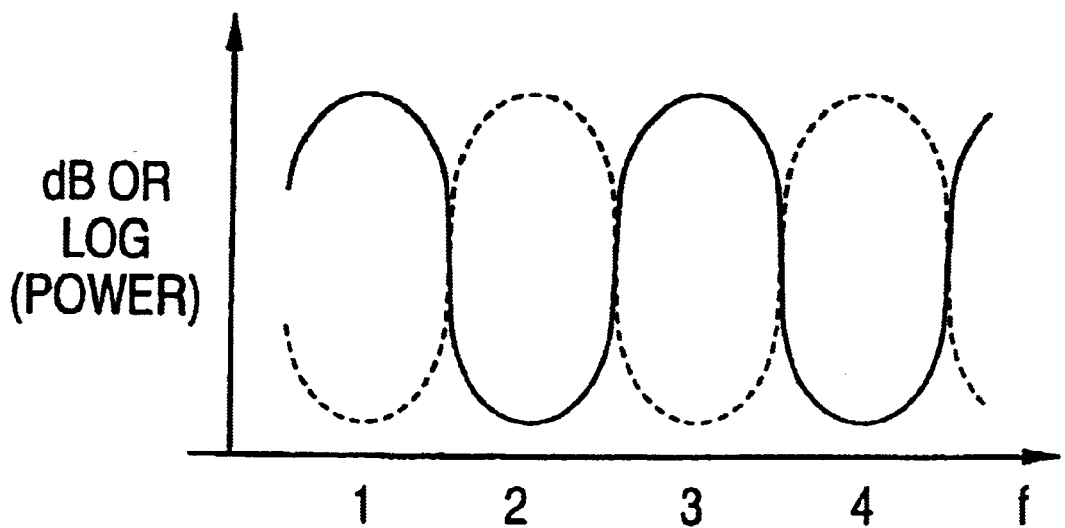
FIG. 15 shows a desirable spectrum.

A desirable spectrum is shown in FIG. 15, in which the shape of the spectrum is more rectangular, and, therefore, approaches more closely the rectangular shape of an ideal spectrum.

Figure 16A:
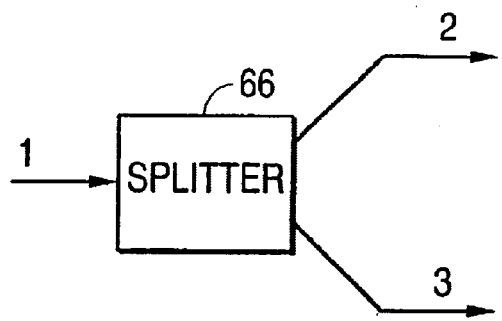
FIG. 16A shows an ideal splitter 66 of the present invention.
Figure 16B:
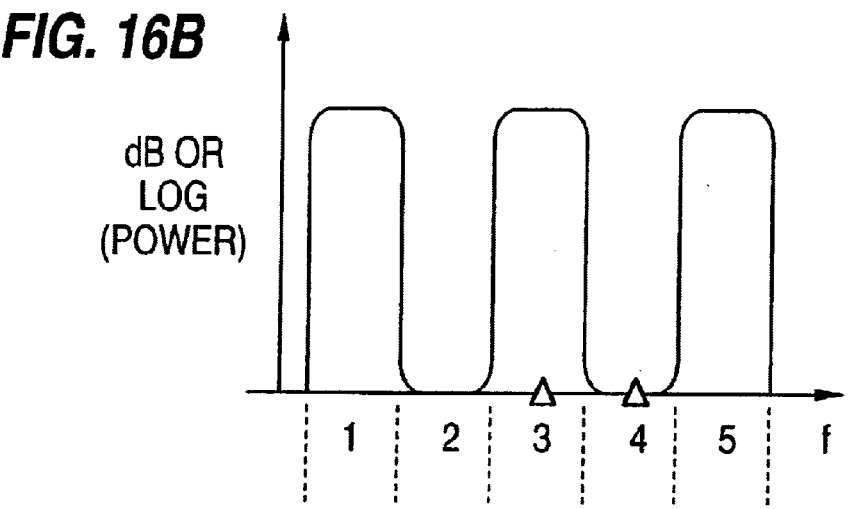
FIGS. 16B and 16C show spectrums of light in the output paths of the splitter shown in FIG. 16A.
Figure 16C:
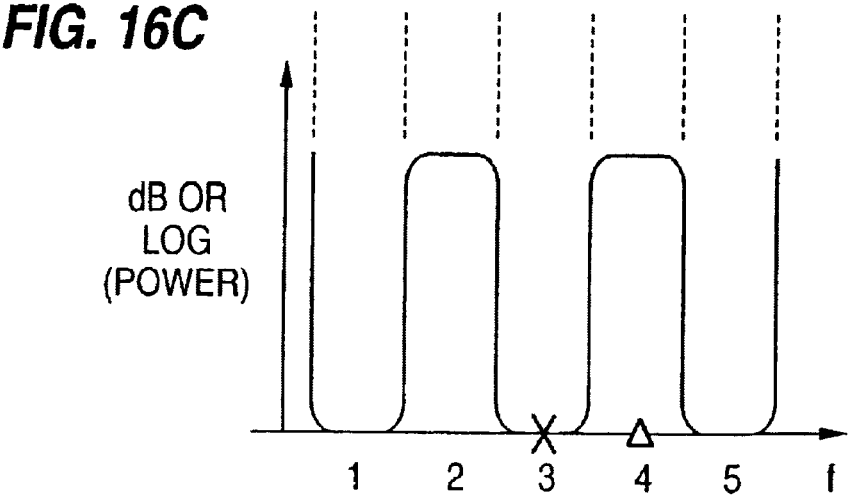

FIG. 16A shows an ideal splitter 66, having input light 1 with channels 1, 2, 3, 4, 5, 6, 7, 8, 9, . . . . Splitter 66 splits the input light into paths 2 (having channels 1, 3, 5, 7, 9, . . . ) and 3 (having channels 2, 4, 6, 8, . . . ). FIG. 16B shows the spectrum of the splitter in path 2, and FIG. 16C shows the spectrum of the splitter in path 3. As shown in FIGS. 16B and 16C, since the spectrum is rectangular, even if the position of the wavelength within each channel fluctuates within the channel, the log(power) or the dB always goes low in (for example) channel 4 in FIG. 16B (as indicated by Δ), or to maximum in channel 3 of FIG. 16B (as indicated by X). Likewise, the log(power) or dB always goes low for channel 3 in FIG. 16C (as indicated by Δ), and to maximum for channel 4 in FIG. 16C (as indicated by X).

An ideal spectrum for a splitter, including splitter 66, would be rectangular and periodic. Periodicity is important because there are many WDM channels, which need to repeat 20–80, even 100, times. The above-mentioned asymmetric Mach-Zehnder interferometer provides periodicity, but not necessary a rectangular shape of the spectrum.

Figure 17:
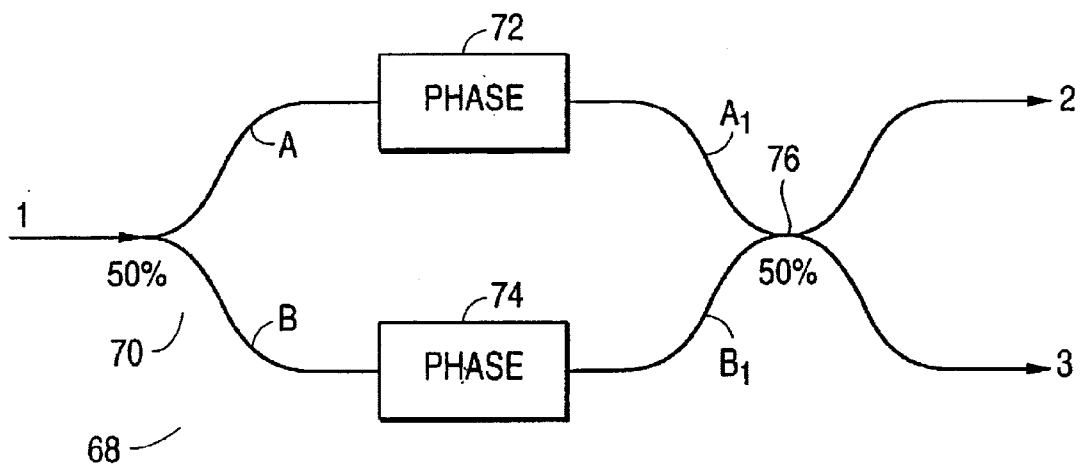
FIG. 17 shows another aspect of the present invention.

A scheme to realize a more ideal spectrum is shown in FIG. 17. In the splitter 68 shown in FIG. 17, the input light 1 to the splitter 68 is divided equally into two arms A and B by 50/50 coupler 70. Arms A and B respectively include phase elements 72 and 74. The light $A_1$ and $B_1$ are recombined by 50/50 coupler 76 after the phase elements 72 and 74. The phase elements 72 and 74 add an optical phase onto the traveling light A and B, which changes periodically as shown in FIG. 18.

The output power from splitter 68 depends upon the relative phase θ between the two arms $A_1$ and $B_1$ in the same manner as in formula (2). In the asymmetric Mach-Zehnder interferometer previously described, the relative phase is generated by the path lengths. However, the splitter 68 shown in FIG. 17 generates the relative phase in other ways, through the inclusion of the phase elements 72 and 74. Therefore, the lengths of both pathways (beginning with arms A and B) in the splitter 68 can be the same, but the splitter 68 is not required to be symmetric.

The phase elements 72 and 74 each add an optical phase which is determined by the frequency, as explained with reference to FIG. 18.

Figure 18:
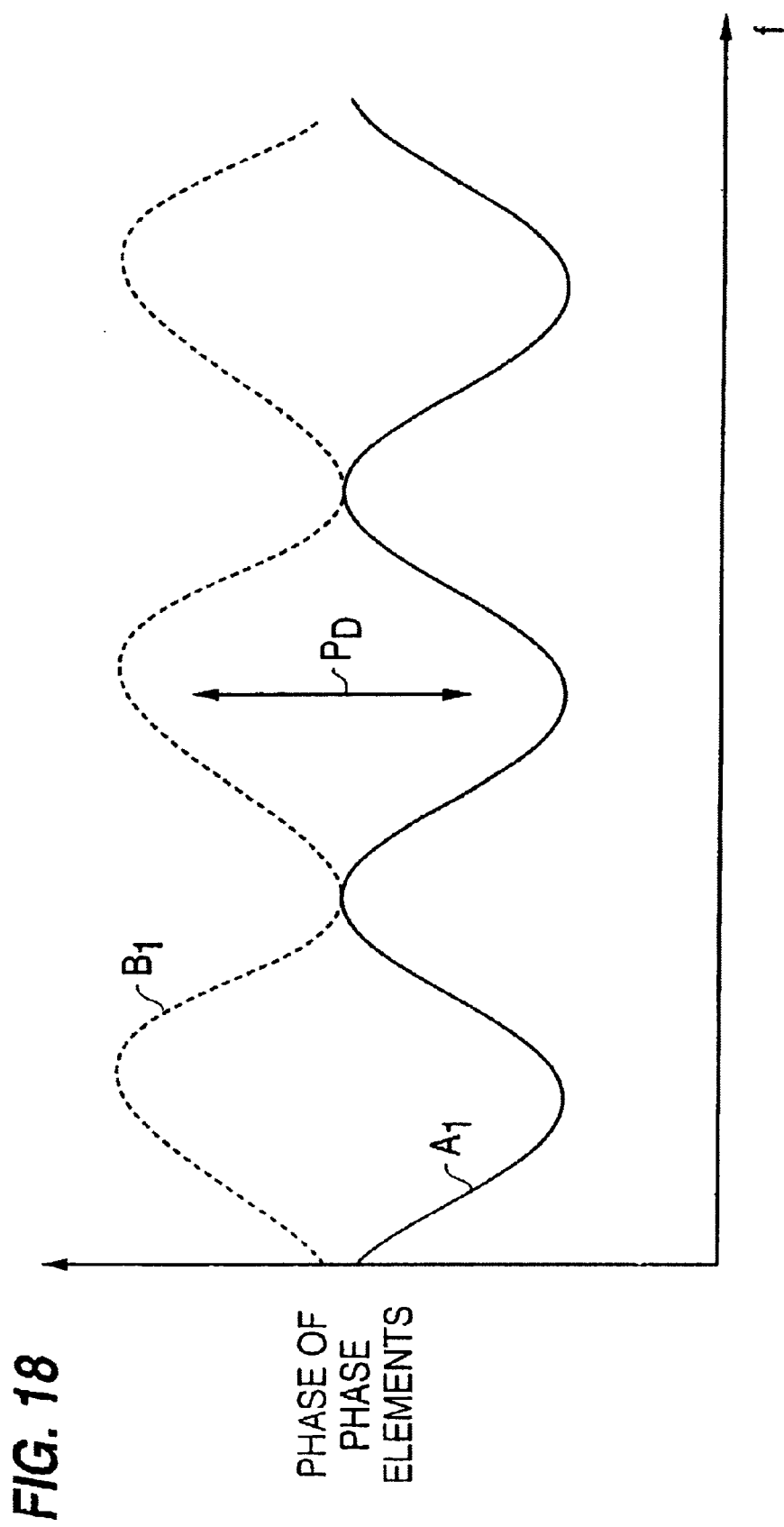
FIG. 18 shows phase added by phase elements 72 and 74 of the present invention.

The solid line shown in FIG. 18 indicates the added phase in one arm (path $A_1$) and the dashed line indicates the added phase in the other arm (path $B_1$) of splitter 68 of FIG. 17. The output light goes to either output 2 or output 3 depending the relative phase, which is the difference ($P_D$) between the solid line $A_1$ and the dashed line $B_1$ in FIG. 18. The phase difference $P_D$ can range between −δ and π+δ, where δ is a small positive angle between 0 and 0.1 radians. The phase curve shown in FIG. 18 need not be sinusoidal, but must be periodic.

The two arms of the light paths A (including $A_1$) and B (including $B_1$) of FIG. 17 can be either light paths in different spaces or orthogonal polarizations of the light in the same space. The splitter 68 of FIG. 17, therefore, provides a better spectrum, approaching the ideal spectrum shown in FIG. 15, over that of the prior art.

Figure 19:
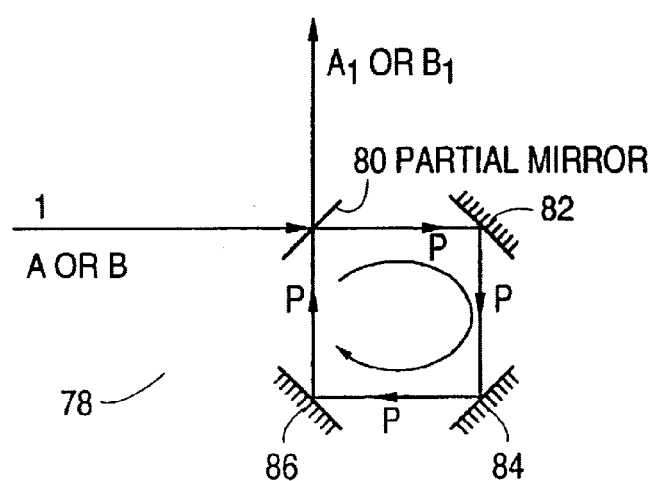
FIGS. 19, 20, and 21 show implementations of phase elements 72 and 74.
Figure 20:
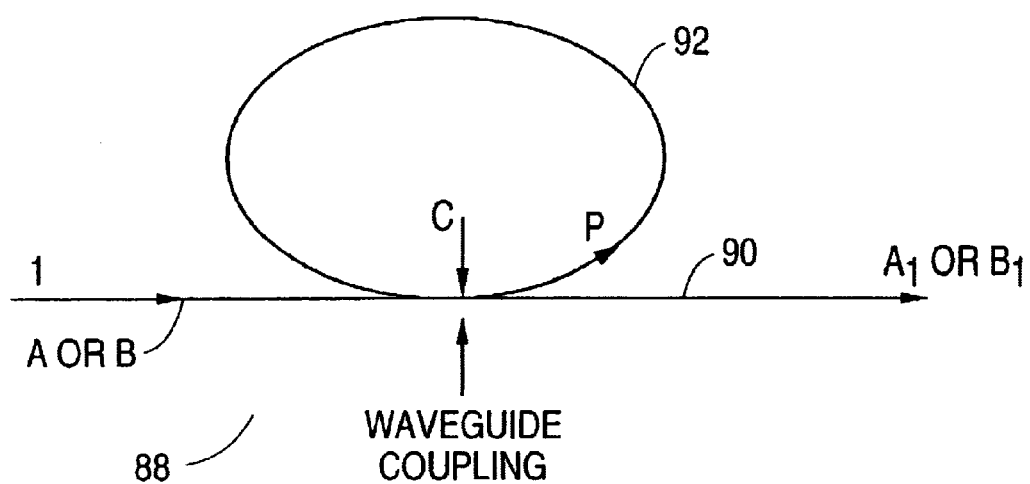
Figure 21:
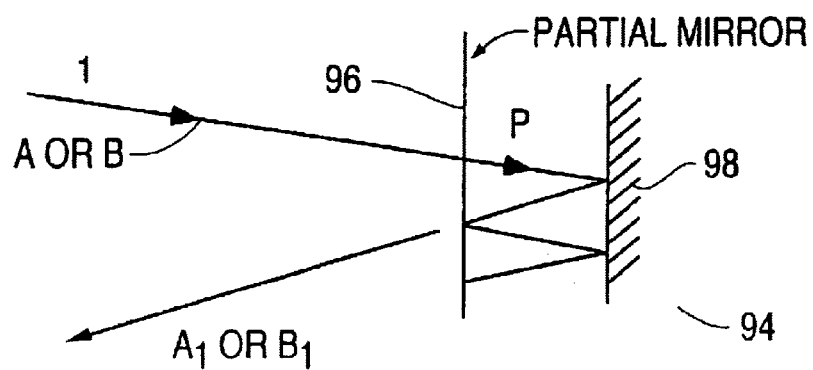

The following three schemes are example implementations of the phase elements 72 and 74 of FIG. 17. The three schemes, shown in FIGS. 19, 20, and 21, are all well known in the art, are mathematically equivalent to each other, and operate under the same principle to add the optical phase shown in FIG. 18. More particularly, in the schemes shown in FIGS. 19–21, a portion of the input light travels through a longer path and is then recombined with the input light.

In the phase element 78 of FIG. 19, the majority of input light 1 (A or B corresponding to FIG. 17) is reflected by partial mirror 80 to output path $A_1$ (for phase element 72 of FIG. 17) or output path $B_1$ (for phase element 74 of FIG. 17). However, a portion of the input light 1 is divided out of the input light by partial mirror 80 and the divided portion of the input light travels a longer light path P, reflected by mirrors 82, 84, and 86, then partially recombines at partial mirror 80 with the input light 1 to affect the optical phase of either output light $A_1$ or $B_1$. $A_1$ and $B_1$, then, are the combination of the output power of light 1 and the part of the input light 1 traveling the longer path P through one or more round trips. The optical phase of output power of $A_1$ and $B_1$, then, depends upon whether the portion of the input light 1 traveling the longer path P is in-phase, out-of-phase, opposite-phase, etc., with the input light 1 being reflected directly along path $A_1$ or $B_1$.

Similar principles apply to the phase element 88 shown in FIG. 20, which uses a waveguide coupling with a loop 92, and to the phase element 94 shown in FIG. 21, which uses a partial mirror 96 and a mirror 98, as shown to accomplish the functions of the phase element 78 shown in FIG. 19.

The phase element 88 shown in FIG. 20 is a waveguide device comprising a main waveguide 90 and a waveguide loop 92 partially coupled to the main waveguide 90 at a position C on the waveguide loop 92.

The phase element 94 shown in FIG. 21 includes a partial mirror 96 allowing the input light A or B to pass through and a mirror 98 off of which the input light A or B is reflected, wherein the input light travels a path P of being reflected between the partial mirror 96 and the mirror 98 until being output from the phase element 94 through the partial mirror 96 along path $A_1$ or $B_1$.

Figure 22:
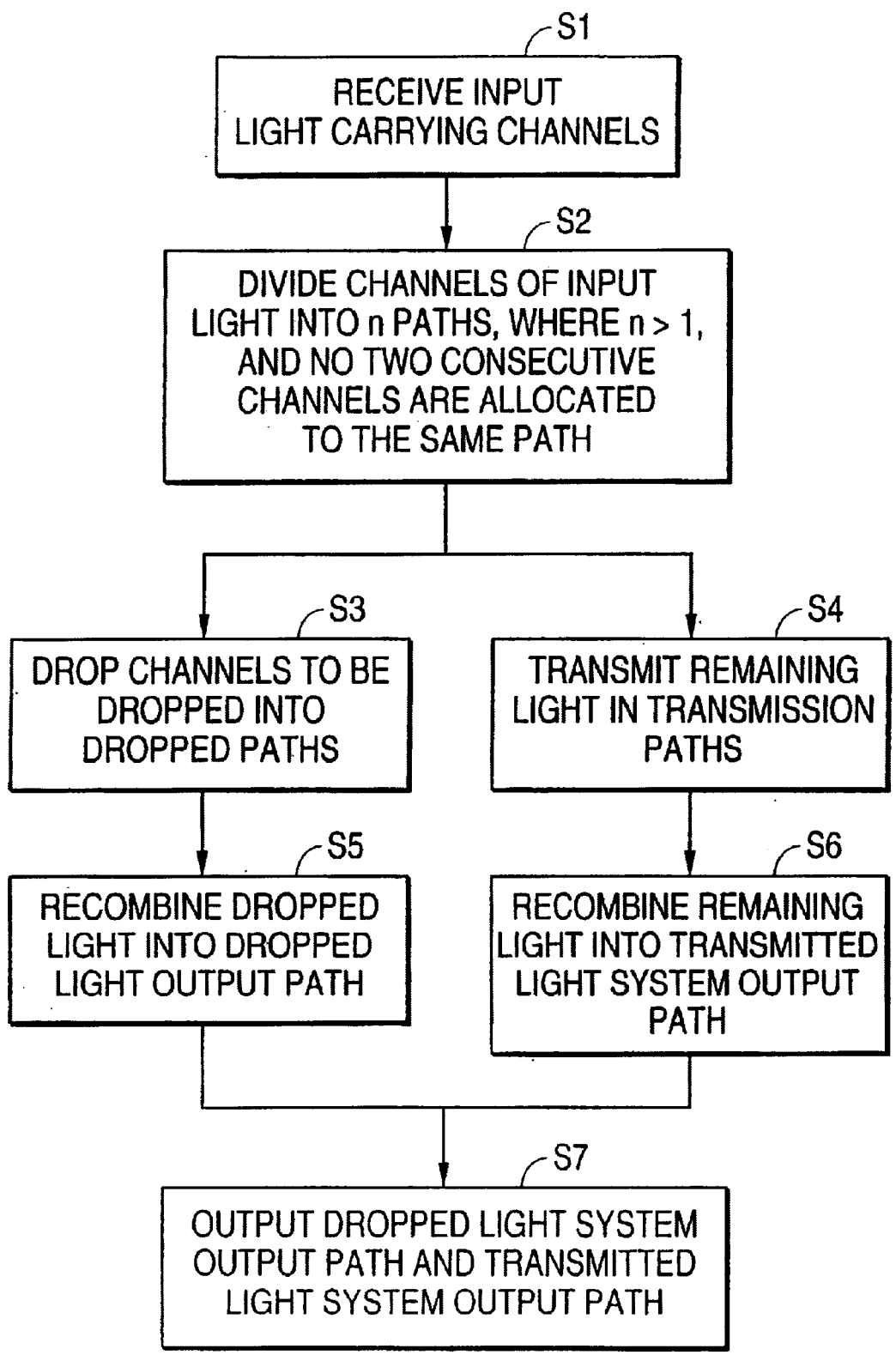
FIG. 22 is a flowchart of the methods of the optical wavelength division multiplexed systems of the present invention.

FIG. 22 is a flowchart of the methods of the optical wavelength division multiplexed (WDM) systems of the present invention. As shown in step S1 of FIG. 22, input light is received by the previously-described WDM systems 24, 30, 40, or 42 of the present invention. Then, in step S2, the channels carried in the input light are divided into n paths, where n>1, and no two consecutive channels are allocated to the same path. More particularly, the channels carried in the input light are divided into 2 paths in the WDM 24 of the present invention shown in FIG. 8 and in the WDM 40 of the present invention shown in FIG. 10, and into 4 paths in the WDM 30 of the present invention shown in FIG. 9 and in the WDM 42 of the present invention shown in FIG. 11. Alternatively, as previously described, the channels carried in the input light could be divided into 3 paths, etc.

Next, in step S3, the WDM of the present invention drops the channel(s) carrying the light to be dropped into dropped paths, using the previously-described cascaded or non-cascaded filters. In step S4, the filters allow the channels which remain and are not dropped to be transmitted within the WDM of the present invention in transmission paths.

The dropped paths are recombined into a dropped light system output path (for example, path C in FIGS. 8, 9, 10, and 11) by the WDM of the present invention, in step S5. In addition, the remaining light is recombined into a transmitted light system output path (for example, path B in FIGS. 8, 9, 10, and 11), in step S6.

Then, the WDM of the present invention outputs the dropped light system output path and the transmitted light system output path.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of dropping channels carried in input light received by an optical wavelength divisional multiplexed system, comprising:
   splitting by the system a portion of the channels into one path within the system and another portion of the channels into another path within the system, said splitting including:
      dividing the input light equally into two arms,
      adding an optical phase to the divided input light which changes periodically,
      splitting the portion of the channels into the one path and into the another path based upon the relative phase between the divided input light; and
   dropping by the system one of the channels into a dropped path.

2. The method according to claim 1, wherein the portion of the channels includes odd-numbered channels and another portion of the channels includes even-numbered channels.

3. The method according to claim 1, further comprising:
   outputting remaining of the channels from the system; and
   outputting the dropped channels from the system.

4. A method of dropping channels carried in input light received by an optical wavelength division multiplexed system, comprising:
   splitting by the system the channels into at least two, separate paths within the system, said splitting including:
      dividing the input light equally into two arms,
      adding an optical phase to the divided input light which changes periodically,
      splitting the channels of one of the at least two, separate paths and another of the at least two, separate paths based upon the relative phase between the divided input light; and
   dropping by the system one of the channels into a dropped path.

5. A method of isolating and dropping channels carried by input light, comprising:
   splitting by a splitter the channels into separate paths, one of the paths carrying odd-numbered channels and another of the paths carrying even numbered channels, said splitting including:
      dividing the input light equally into two arms,
      adding an optical phase to the divided input light which changes periodically,
      splitting the channels of one of the paths and another of the paths based upon the relative phase between the divided input light; and
   dropping by a filter one of the channels into a dropped path.

6. A method of isolating a channel carried in input light received by an optical wavelength division multiplexed system, comprising:
   splitting the channel into one path and next higher and lower-numbered channels from the channel into another path, said splitting including:
      dividing the input light equally into two arms,
      adding an optical phase to the divided input light which changes periodically,
      splitting the channel and the next higher and lower-numbered channels based upon the relative phase between the divided input light; and
   dropping the channel into a dropped path.

7. The method according to claim 6, wherein the channel is odd-numbered and the next higher and lower channels are even-numbered.

8. The method according to claim 6, further comprising:
   outputting the next higher and lower channels from the system; and
   outputting the dropped channel from the system.

* * * * *

UNITED STATES PATENT AND TRADEMARK OFFICE
CERTIFICATE OF CORRECTION

PATENT NO. : 6,901,183 B2
DATED : May 31, 2005
INVENTOR(S) : Masataka Shirasaki et al.

It is certified that error appears in the above-identified patent and that said Letters Patent is hereby corrected as shown below:

<u>Column 15,</u>
Line 52, after "dropped" replace "channels" with -- channel --.

<u>Column 16,</u>
Line 21, replace "even numbered" with -- even-numbered --.

Signed and Sealed this

Twenty-eighth Day of March, 2006

JON W. DUDAS
*Director of the United States Patent and Trademark Office*